US012485148B2

(12) United States Patent
Correia et al.

(10) Patent No.: US 12,485,148 B2
(45) Date of Patent: Dec. 2, 2025

(54) COMPOSITIONS COMPRISING SMALL EXTRACELLULAR VESICLES DERIVED FROM UMBILICAL CORD BLOOD MONONUCLEAR CELLS WITH ANTI-INFLAMMATORY AND IMMUNOMODULATORY PROPERTIES AND PROCESS FOR OBTAINING THEM

(71) Applicant: EXOGENUS THERAPEUTICS, SA, Cantanhede (PT)

(72) Inventors: Joana Correia, Tentúgal (PT); Renato Cardoso, Luso (PT); Sílvia Rodrigues, Matosinhos (PT)

(73) Assignee: EXOGENUS THERAPEUTICS, SA (PT)

( * ) Notice: Subject to any disclaimer, the term of this patent is extended or adjusted under 35 U.S.C. 154(b) by 915 days.

(21) Appl. No.: 17/282,090

(22) PCT Filed: Oct. 4, 2019

(86) PCT No.: PCT/IB2019/058462
§ 371 (c)(1),
(2) Date: Apr. 1, 2021

(87) PCT Pub. No.: WO2020/070700
PCT Pub. Date: Apr. 9, 2020

(65) Prior Publication Data
US 2021/0369789 A1    Dec. 2, 2021

(30) Foreign Application Priority Data
Oct. 4, 2018  (PT) ........................................ 115057

(51) Int. Cl.
| | | |
|---|---|---|
| *A61K 35/51* | (2015.01) | |
| *A61P 17/02* | (2006.01) | |
| *A61P 17/06* | (2006.01) | |
| *B01D 15/34* | (2006.01) | |
| *C12N 5/00* | (2006.01) | |
| *C12N 5/078* | (2010.01) | |

(52) U.S. Cl.
CPC .............. *A61K 35/51* (2013.01); *A61P 17/02* (2018.01); *A61P 17/06* (2018.01); *B01D 15/34* (2013.01); *C12N 5/0037* (2013.01); *C12N 5/0634* (2013.01)

(58) Field of Classification Search
CPC ........... A61K 35/51; A61P 17/06; A61P 17/02
See application file for complete search history.

(56) References Cited

U.S. PATENT DOCUMENTS

| | | | |
|---|---|---|---|
| 2012/0093885 A1 | 4/2012 | Sahoo | |
| 2020/0289583 A1* | 9/2020 | Ferreira | .................. A61P 27/02 |
| 2021/0161967 A1* | 6/2021 | Barilani | ................. A61K 35/28 |
| 2023/0111666 A1* | 4/2023 | El Andaloussi | ........ A61P 31/00 435/375 |

FOREIGN PATENT DOCUMENTS

| | | | |
|---|---|---|---|
| WO | 2014/028493 A2 | 2/2014 | |
| WO | WO-2017163132 A2 * | 9/2017 | ......... A61K 31/7105 |
| WO | 2018/004237 A1 | 1/2018 | |

OTHER PUBLICATIONS

Christianson et al. (Proc Natl Acad Sci USA. Oct. 22, 2013;110(43):17380-5. doi: 10.1073/pnas.1304266110. Epub Oct. 7, 2013.) (Year: 2013).*
Heinemann et al., (Methods Mol Biol . 2017:1660:33-41. doi: 10. 1007/978-1-4939-7253-1_4.) (Year: 2014).*
Livshits et al., (Sci Rep . Nov. 30, 2015:5:17319. doi: 10.1038/srep17319. (Year: 2015).*
Li et al., Theranostics. Jan. 27, 2017;7(3):789-804. doi: 10.7150/thno.18133 (Year: 2017).*
Théry et al. (Curr Protoc Cell Biol. Apr. 2006:Chapter 3:Unit 3.22. doi: 10.1002/0471143030.cb0322s30.), see IDS (Year: 2006).*
Witwer et al., (J Extracell Vesicles. May 27, 2013;2:10.3402/jev. v2i0.20360. doi: 10.3402/jev.v2i0.20360) (Year: 2013).*
ISR; European Patent Office; Netherlands; Jan. 22, 2020.
Clotilder Thery et al: "Isolation and Characterization of Exosomes From Cell Culture Supernatants and Biological Fluids;" May 1, 2001.
Zheng Liu et al; "Microrna-150 Protects the Heart From Injury by Inhibiting Monocyte Accumulation in a Mouse Model of Acute Myocardial Infarction;" Feb. 1, 2015.
Yefta Moenadjat et al: "The Application of Human Umbilical Cord Blood Mononuclear Cells in the Management of Deep Partial Thickness Burn;" Jan. 1, 2013.
Hironao Nakayama et al; "Cell Surface Annexins Regulate Adam-Mediated Extodomain Shedding of Proamphiregulin;" May 1, 2012.

(Continued)

*Primary Examiner* — Fereydoun G Sajjadi
*Assistant Examiner* — Joel D Levin

(57) ABSTRACT

The present invention relates to a process for isolating Small Extracellular Vesicles secreted by umbilical cord blood mononuclear cells (UCBMNCs) and compositions comprising said Small Extracellular Vesicles, which are useful to be applied to autoimmune diseases therapeutics or prophylactics and/or cosmetic purposes.

The proposed process for isolating UCBMNCs Small Extracellular Vesicles comprises three main steps: i) a first step of sequential centrifugation, ii) a second step of microfiltration combined with ultrafiltration (UF), and iii) a third step of size exclusion chromatography (SEC) and aims to achieve highly pure Small Extracellular Vesicles and in a higher yield.

The SEVs compositions comprise specific type of proteins, RNA and lipids, that enables them to be very effective when applied to inflammatory and autoimmune diseases therapeutics, such as psoriasis, lupus, atopic dermatitis, eczema, etc. and also to cosmetic or prophylactic compositions.

Therefore, the present invention lays in the technical domain of pharmaceuticals, medicine, cosmetics, research and development in cellular biology and appliances thereof.

6 Claims, 14 Drawing Sheets

(56) References Cited

OTHER PUBLICATIONS

Krusic et al; "Extracellular Vesicles From Human Cerebrospinal Fluid Are Effectively Separated by Sepharose CL-6B—Comparison of Four Gravity-Flow Size Exclusion Chromatography Methods"; Biomedicines 2022.

Cytiva; "Size Exclusion Choromatography Columns and Resins"; Sep. 29, 2020.

* cited by examiner

COMPOSITIONS COMPRISING SMALL EXTRACELLULAR VESICLES DERIVED FROM UMBILICAL CORD BLOOD MONONUCLEAR CELLS WITH ANTI-INFLAMMATORY AND IMMUNOMODULATORY PROPERTIES AND PROCESS FOR OBTAINING THEM

TECHNICAL DOMAIN OF THE INVENTION

The present invention relates to a process for isolating Small Extracellular Vesicles (SEVs) secreted by umbilical cord blood mononuclear cells (UCBMNCs) and compositions comprising said SEVs, which are useful to be applied to autoimmune disease therapeutics or prophylactics and to other diseases related to the immune system and also for cosmetic purposes.

Therefore, the present invention lays in the technical domain of pharmaceuticals, medicine, cosmetics, research and development in cellular biology and appliances thereof.

BACKGROUND OF THE INVENTION

Autoimmune diseases (AD) are among the most prevalent group of diseases, with 50 million patients only in US. These diseases are chronic and often life-threatening, and according to AARDA (American Autoimmune Related Diseases Association), they are one of the top 10 leading causes of death in female children and women in all age groups up to 64 years of age ("Autoimmune Disease Statistics—AARDA" n.d.).

Among the roughly 100 different AD identified to date, there are some with strong skin manifestations such as Psoriasis, Systemic Lupus Erythematosus (SLE), atopic dermatitis or eczema. While not life-threatening, these inflammatory skin diseases cause a significant discomfort in the patients' daily life and are frequently associated with psychological disorders. These diseases manifest in many forms, from occasional rashes accompanied by skin itching and redness, to chronic conditions such as dermatitis, rosacea, seborrheic dermatitis, and psoriasis.

At the onset of inflammatory/autoimmune skin diseases, there is an immune imbalance between regulatory T cells (Tregs) and effector T cells (Teffs), widely recognized as a key driver of autoimmunity.

Inflammatory skin diseases are also characterized by an improper and persistent inflammatory response. Although an acute inflammatory response tends to resolve the skin insult, a persistent inflammatory stimuli or dysregulation of inflammatory mechanisms can lead to chronic inflammation, contributing to a variety of chronic inflammatory diseases with skin manifestation namely atopic dermatitis and psoriasis.

*Psoriasis vulgaris* is a T and dendritic cell-driven pathology. Different subsets of T helper cells and epidermal CD8 T cells have been reported as key players in the psoriasis pathogenesis. Moreover, it is generally accepted that the pathogenesis of psoriasis involves accumulation of effector T-cells within lymph nodes and their subsequent migration into the skin through the blood system.

The most advanced therapies for AD target specific biomolecules such as tumour necrosis factor-alpha (TNF-alpha) or interleukin (IL)-12/23 and IL-17A, shutting down the exacerbated immune response through a strong immunosuppressant effect. Although they efficiently control AD in many cases, these therapies have strong secondary effects namely because they expose the patients to other opportunistic illnesses such as infections.

Accordingly, there is a need to develop other treatment options that increase the tolerance of the immune system, without strongly suppressing its main functions, consequently reducing secondary side effects.

A suitable approach is using SEVs derived from an immature human tissue with a primitive immune system, such as the UCBMNCs as a therapeutic option for autoimmune diseases, with a favourable safety and tolerability profile, which is able to orchestrate a more complex response, by directly regulating gene expression.

SEVs are liposome-like vesicles secreted by most living cells, with around 30-200 nm. These SEVs act as key mediators of the communication between different cell types, namely through modulation and transport of small RNAs. Cell types commonly employed in regeneration of injured tissues, such as UCBMNCs or mesenchymal cells are rich sources of SEVs. These stem cell-derived SEVs have been demonstrated to successfully replace cell-based therapies, improving the function of damaged organs in different animal models of injury and also modulating the immune system.

Isolation of SEVs has been a widely discussed theme in literature and there are several approaches already available.

Document WO2017163132 discloses a method for isolating SEVs from UCBMNCs and several compositions comprising vesicles secreted by UCBMNCs, and their use for promoting tissue repair, in particular wound healing.

The compositions described in document WO2017163132 are obtained by a method of purification based in differential centrifugation techniques, to isolate and purify the SEVs secreted from UCBMNCs. Despite resulting in good yields of isolated vesicles, said method is highly influenced by human manipulation, is time-consuming and includes several steps that may result in major sample loss, resulting in the retention of a significant amount of contaminants such as lipoproteins and other soluble proteins.

Document WO2017163132 also discloses compositions containing SEVs from UCBMNCs, said Small Extracellular Vesicles comprising one or more micro RNA (miRNA), being the most preferable compositions the ones comprising Small Extracellular Vesicles with at least the miRNA hsa-miR-150-5p. These compositions have a specific composition in small RNAs, which is a cumulative consequence from the subpopulation of secreting cells (Mononuclear Cells isolated by ficoll gradient), and the purification method (based in ultracentrifugation). This limits their therapeutic potential, which could be augmented if they contain other small RNAs that are known to promote tissue repair, and more specifically skin wound healing, such as miR-22-3p. Moreover, these compositions are expected to have limited impact in the regulation of inflammation and immune cells, which are crucial for tissue repair. Compositions comprising for example let-7c-5p or miR-27a-3p, which control inflammation, could ameliorate the prolonged inflammatory state of staled chronic wounds, and stimulate wound healing.

Therefore, there is a need to develop compositions and methods for producing such compositions with stronger potential to be applied as therapies for tissue repair, such as skin lesions, and other diseases with important contribution of inflammation and the immune system.

The present invention solves these problems by proposing a faster and more efficient method for isolating SEVs essentially secreted by UCBMNCs, which may comprise an automatic umbilical cord blood (UCB) processing step and a standardized and partially automated SEVs purification process, allowing to obtain higher SEVs yields with higher purity, in a reproducible manner.

Another object of the present invention is to obtain compositions comprising a particular type of Small Extracellular Vesicles with specific pro-regenerative, anti-inflammatory and immunomodulatory properties that are promising tools to use as therapies in the setting of inflammatory and autoimmune diseases, with or without skin manifestation, or for prophylactic and cosmetic uses.

SUMMARY OF THE INVENTION

The present invention relates to a process for isolating Small Extracellular Vesicles secreted by umbilical cord blood mononuclear cells (UCBMNCs) and compositions comprising said Small Extracellular Vesicles, which are useful to be applied to inflammatory, autoimmune and/or immune system diseases therapeutics or prophylactics and/or cosmetic purposes.

Therefore, in a first embodiment of the present invention it is proposed a process for isolating Small Extracellular Vesicles secreted by umbilical cord blood mononuclear cells (UCBMNCs) according to claim 1.

This process achieves highly pure Small Extracellular Vesicles (vesicles with 50-200 nm representing >75% of the purified sample) and a high yield (at least $4\times10^9$ Small Extracellular Vesicles obtained from each mL of conditioned medium). Moreover, it can be easily standardized and up-scaled under good manufacturing practices (GMP). Another advantage of this method is that can be partially automated, and therefore results are highly reproducible and obtained in a faster way.

The error bars represent the SEM. The statistical test performed was a One-Way ANOVA with: ****$p<0.0001$.

Figure 4:
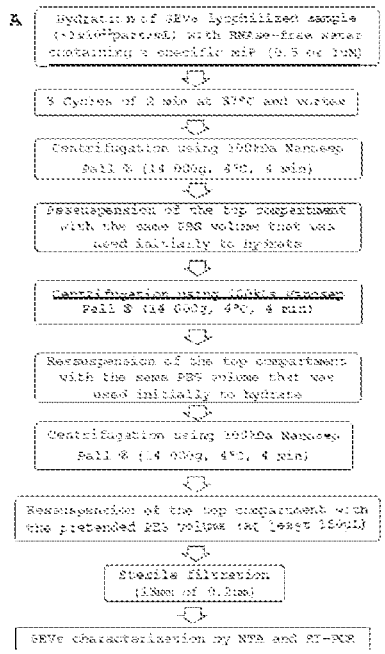
Figure 4:
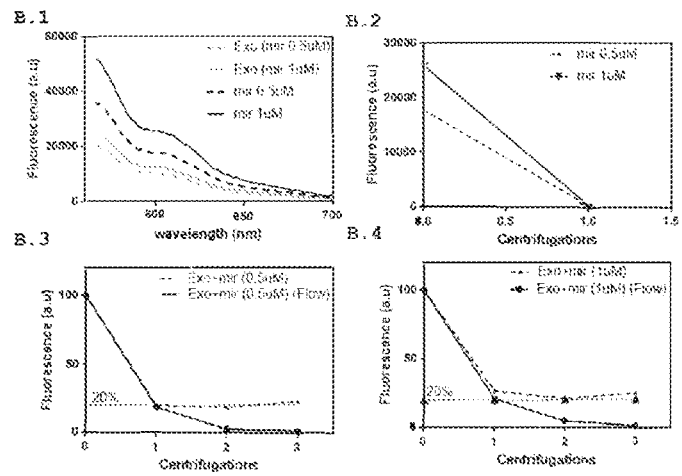

FIG. 4. Modification of the SEVs with fluorescence miRNA. A. Schematic workflow for the modification of the SEVs with miRNAs.

B.1—Fluorescence spectra of the solution containing a fluorescent miRNA mimic with (gray) and without (black) SEVs.
B.2—Fluorescence of the top compartment (Filter) after 1 centrifugation of a solution containing 1 uM of miR and no SEVs.
B.3, B.4—Fluorescence of the top compartment (Filter) after 3 centrifugation steps of a solution containing 1 uM of fluorescence miR and $1\times10^{11}$ part/mL SEVs. After 3 centrifugations the remaining fluorescence corresponds to miR that was incorporated in the SEVs.

Figure 5:
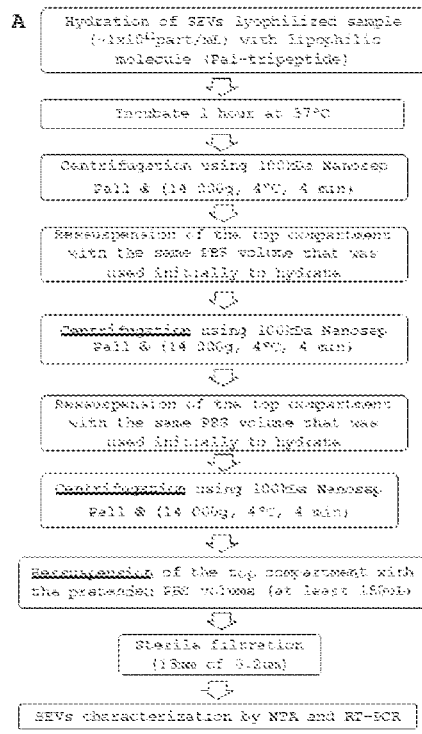
Figure 5:
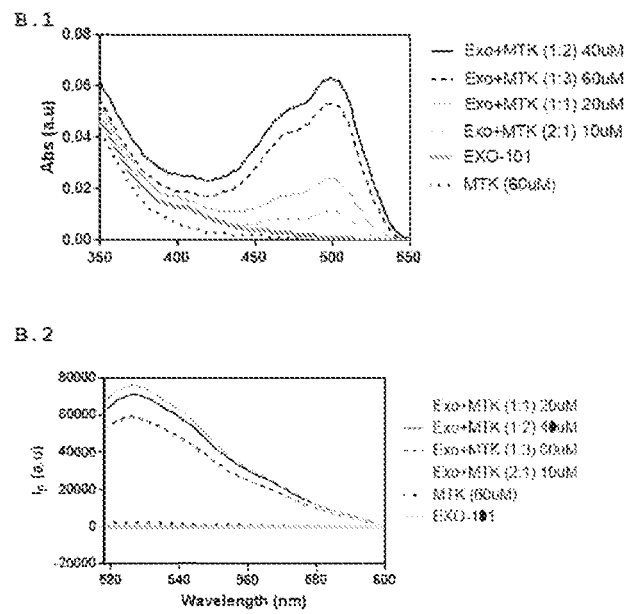

FIG. 5. Modification of the SEVs with fluorescent Palmitoylated peptide (MTK).
A. Schematic workflow for the modification of the SEVs with MTK.
B.1—Absorption spectra of the solution containing a fluorescent MTK SEVs.
B.2—Fluorescence of the MTK modified SEVs.

Figure 6:
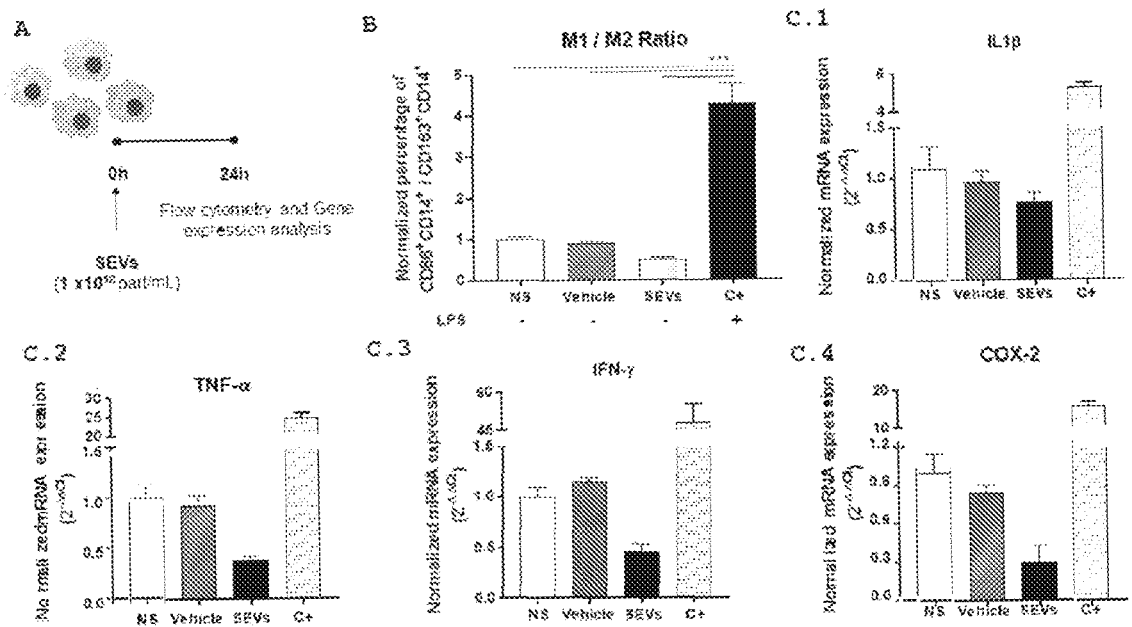

FIG. 6. Anti-inflammatory effect of SEVs on THP-1 derived macrophages.
A. Schematic diagram of experimental design. After differentiation of THP-1 cells into macrophages with PMA (25 nM) treatment, macrophages were stimulated with SEVs ($1\times10^{10}$ part/mL). LPS (1 µg/mL) as positive control. 24 h after SEVs administration, THP-1 macrophage RNA was extracted, and cells were used for flow cytometry.
B. M1/M2 macrophage ratio was evaluated by flow cytometry. M1 macrophages were defined as $CD14^+CD86^+$ and M2 macrophages as $CD14^+CD163^+$. SEVs treatment was able to decrease this proportion, although the result is not statistically significant.
C. Proinflammatory cytokine mRNA expression was evaluated by qRT-PCR. (C1) IL1b, (C2) TNFa, (C3) IFNg and (C4) Cox-2 expression decreased upon SEVs treatment.
The error bars represent the SEM. The statistical test performed was a One-Way ANOVA with:  for $p<0.01$ and * for $p<0.001$.

Figure 7:
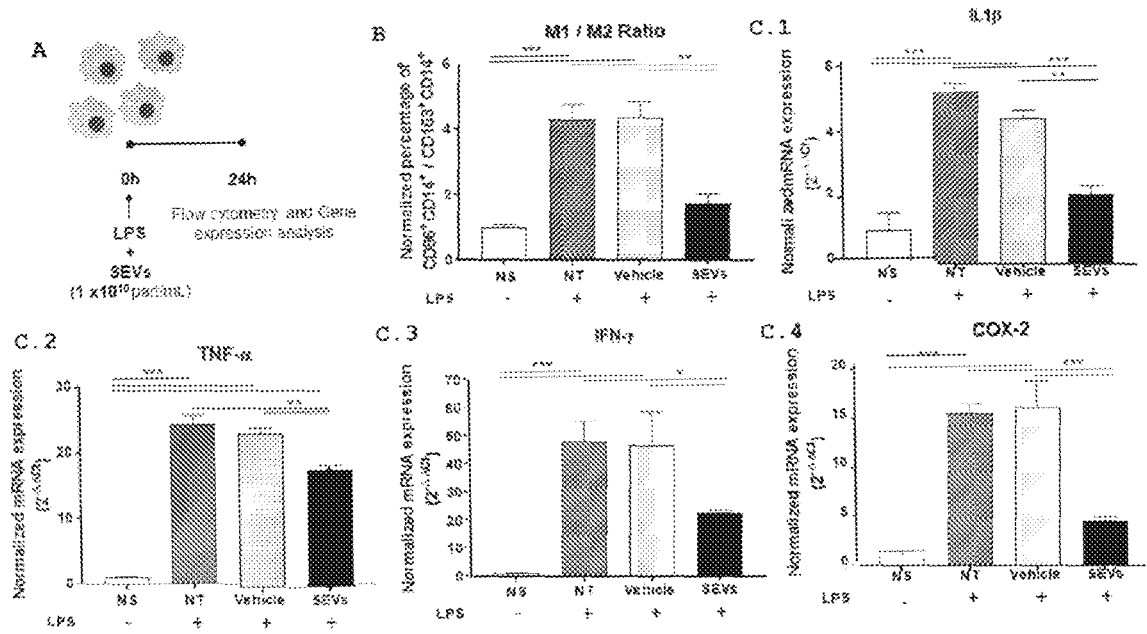

FIG. 7. SEVs effect on THP-1 derived macrophages are able to counteract a pro-inflammatory stimulus.
A. Schematic diagram of experimental design. After differentiation of THP-1 cells into macrophages with PMA (25 nM) treatment, THP-1 derived macrophages were stimulated at the same with LPS (1 ug/mL) and SEVs ($1\times10^{10}$ part/mL). 24h after SEVs administration, THP-1 macrophage RNA was extracted, and cells were used for flow cytometry.
B. M1/M2 macrophage ratio was evaluated by flow cytometry. M1 macrophages were defined as $CD14^+CD86^+$ and M2 macrophages as $CD14^+CD163^+$. SEVs treatment was able to significantly decrease this proportion.
C. Proinflammatory cytokine mRNA expression was evaluated by qRT-PCR. (C1) IL1b, (C2) TNFa, (C3) IFNg and (C4) Cox-2 expression decreased upon SEVs treatment.
The error bars represent the SEM. The statistical test performed was a One-Way ANOVA with:  for $p<0.01$ and * for $p<0.001$.

Figure 8:
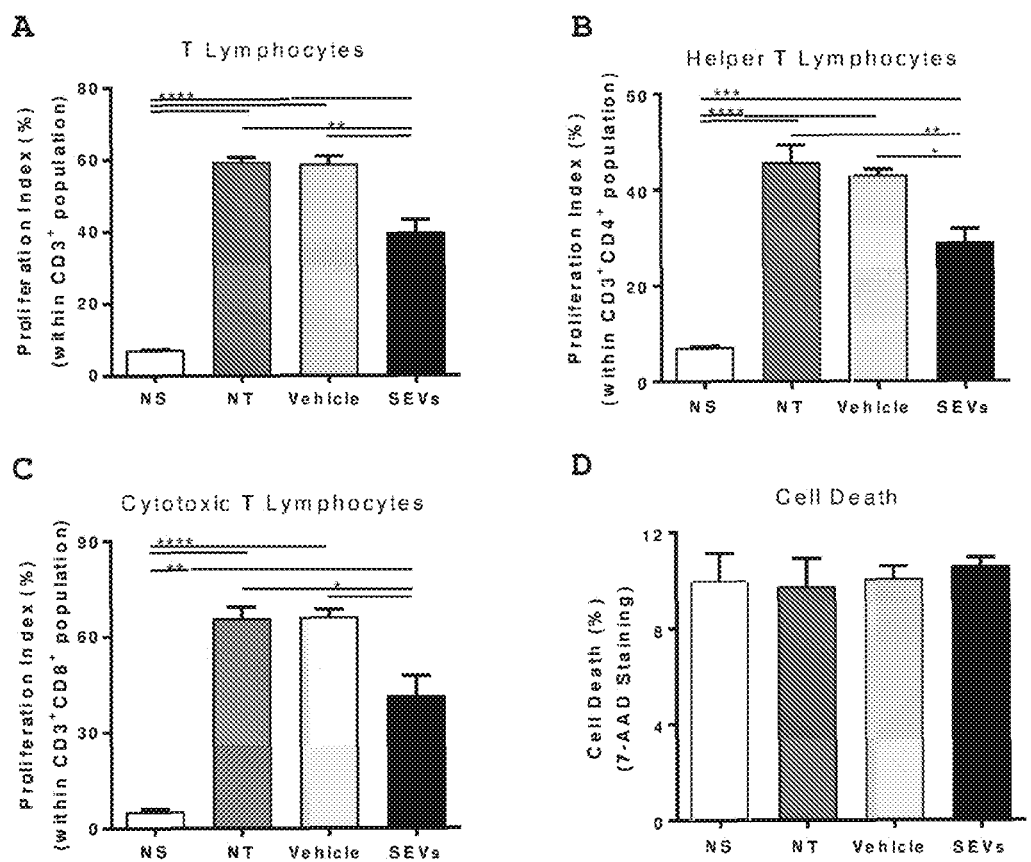

FIG. 8. SEVs decrease T cell proliferative capacity. PBMNCs were incubated for 6 days with PHA and SEVs or the vehicle. As negative control, PBMNCs were not stimulated with the mitogen (NS) and as positive control, non-treated PBMNCs were used (NT).
Proliferation index measured by CFSE intensity of:
A. overall T cell proliferation (CD3+ cells);
B. helper T cells (CD3+CD4+);
C. cytotoxic T cell subset (CD3+CD8+);
D. Overall T cell viability. Internalization of 7-AAD was used to stain death cells.

Results are presented as mean±SEM (n=6 for SEVs and n=1 for PBMNCs donor). Statistical analysis was performed using one-way ANOVA. * for $p<0.05$; * for $p<0.001$ and ** for $p<0.0001$.

Figure 9:
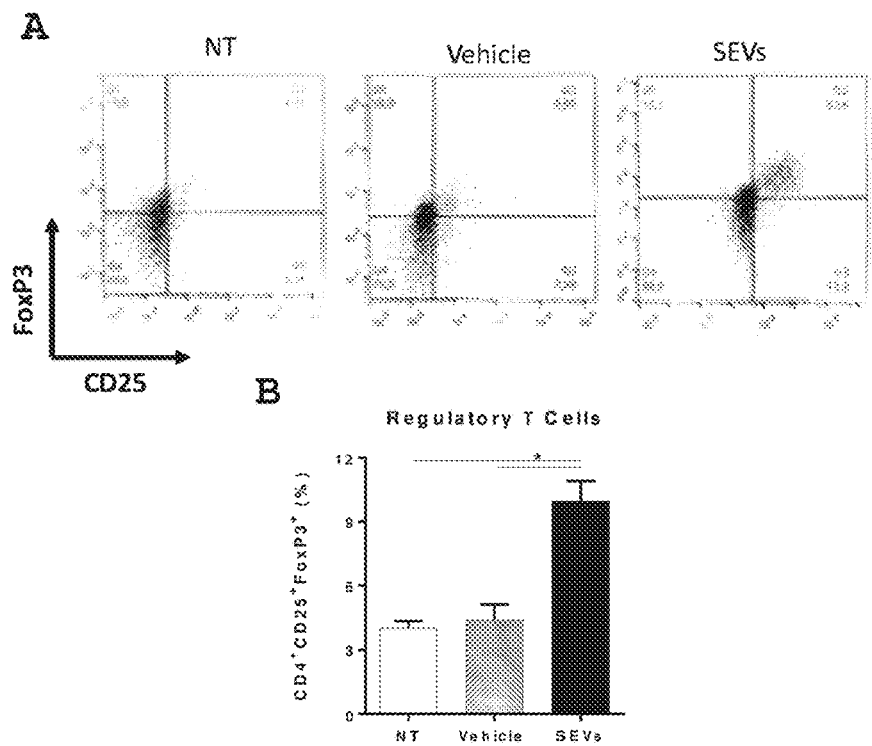

FIG. 9. SEVs bioactivity on regulatory T cells differentiation. Healthy blood donors PBMNCs were incubated with SEVs ($1\times10^{10}$ part/mL) or the vehicle for 6 days. After that, cells were washed and stained for FACS analysis.
A. Representative flow cytometry dot plot of each condition;
B. Percentage of regulatory T cells after 6 days of incubation. Regulatory T cells were identified by the concomitant expression of CD3, CD4, CD25 and FoxP3.
C. Results are presented as mean±SEM (n=6 for SEVs and n=2 for PBMNCs donor). Statistical analysis was performed using one-way ANOVA. * for $p<0.05$; * for $p<0.001$ and ** for $p<0.0001$.

Figure 10:
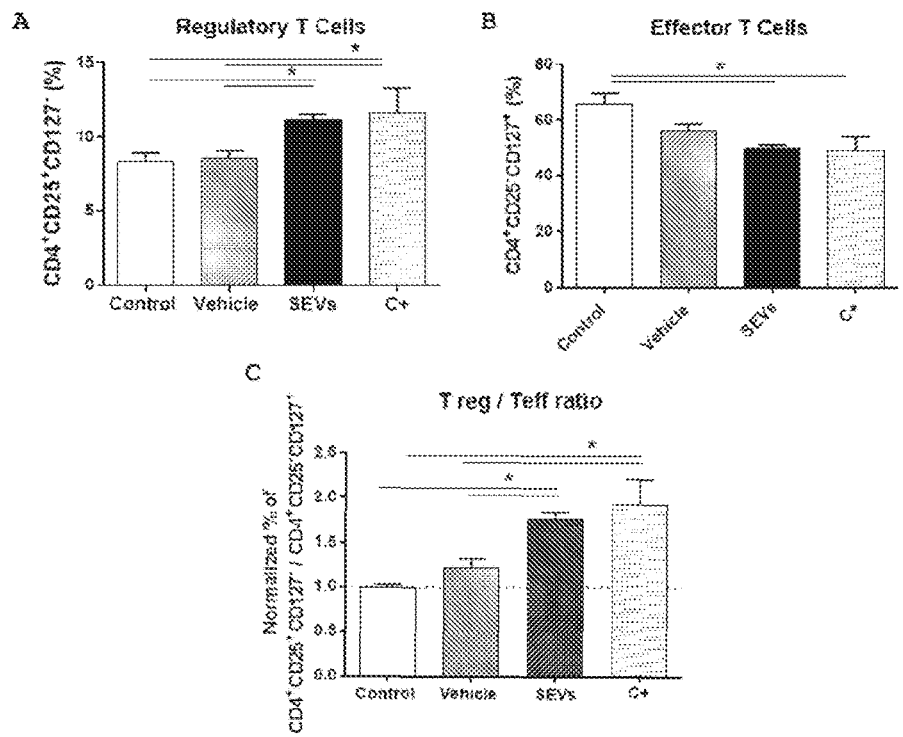

FIG. 10. SEVs immunomodulatory activity. After activation with anti-CD3 and anti-CD28, healthy blood donors PBMNCs were incubated with SEVs ($1\times10^{10}$ part/mL) or the vehicle for 6 days. Cells were washed and stained for FACS analysis. For positive control (C+), PBMNCs were additionally stimulated with IL-2 (100 IU/ml) and TGF-β (5 ng/mL).
A. Percentage of regulatory T cells after 6 days of incubation. Treg were identified as CD4$^+$CD25$^+$CD127$^-$
B. Percentage of effector T cells after 6 days of incubation. Teff as CD4$^+$CD25$^-$CD127$^+$.
C. Ratio Treg/Teff.

Results are presented as mean±SEM (n=6 for SEVs and n=1 for PBMNCs donor). Statistical analysis was performed using one-way ANOVA. * for $p<0.05$; * for $p<0.001$ and ** for $p<0.0001$.

Figure 11:
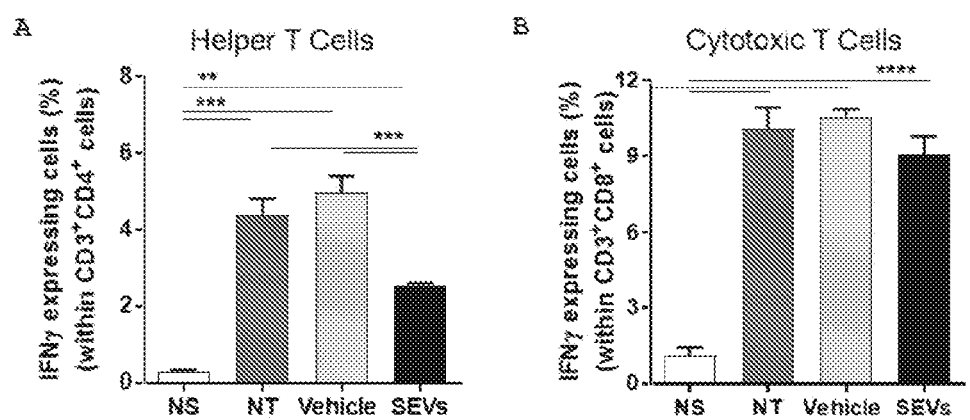

FIG. 11. SEVs inhibits the IFN-γ production of in vitro stimulated T cells. After activation with antiCD3/antiCD28, PBMNCs were incubated for 6 days with SEVs or the vehicle. As negative control, PBMNCs were not activated (NS) and as positive control, non-treated PBMNCs were used (NT). Graphs indicated the overall percentage of IFN-γ producing cells in each condition within (A) CD3+CD4+ and (B) CD3+CD8+ T cell subsets. Results are presented as mean±SEM (n=6 for SEVs and n=1 for PBMNCs donor). Statistical analysis was performed using one-way ANOVA. * for $p<0.05$;  for $p<0.01$; * for $p<0.001$ and **** for $p<0.0001$.

Figure 12:
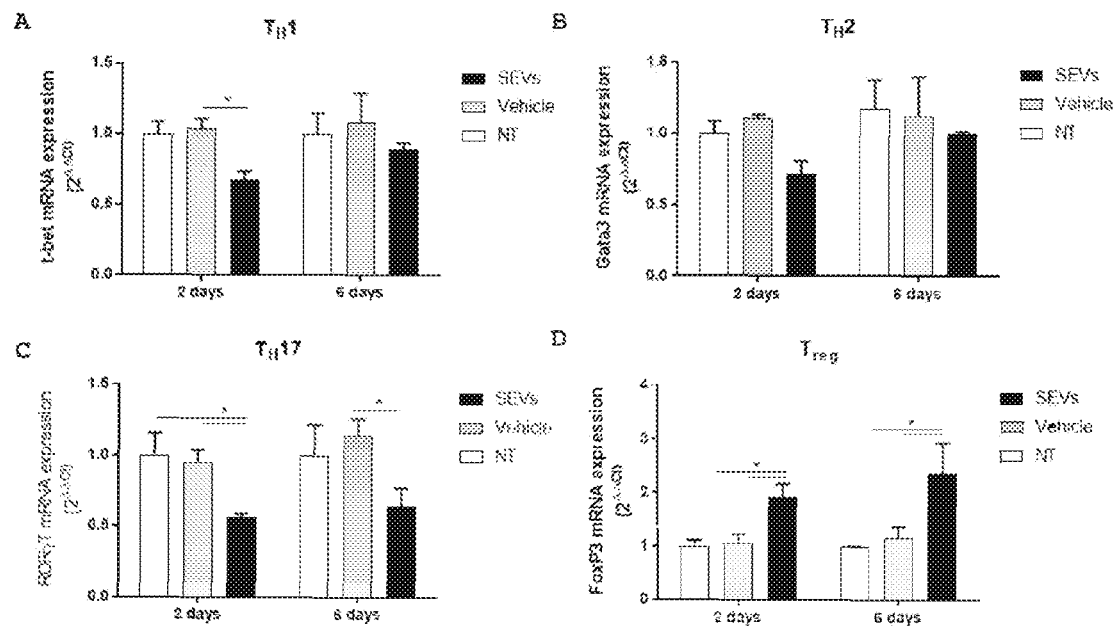

FIG. 12. SEVs differentially influence master transcriptional T cell factors expression Healthy blood donors PBMNCs were incubated with SEVs ($1\times10^{10}$ part/mL) or the vehicle (PBS) for 2 and 6 days and the lymphocyte compartment was sorted based on morphological features (FSC and SSC) and CD3+CD4+ staining. Then, total RNA was extracted, and gene expression analysis was performed using β-actin as reference gene. The normalized expression levels were calculated based on $2^{-\Delta\Delta Ct}$.
A. mRNA expression of $T_H1$ master transcription factor t-bet;
B. mRNA expression of $T_H2$ master transcription factor Gata3;
C. mRNA expression of $T_H17$ master transcription factor RORgt;
D. mRNA expression of $T_{r}eg$ master transcription factor FOXP3.

Results are presented as mean±SEM (n=6 for SEVs and n=2 for PBMNCs donor). Statistical analysis was performed using one-way ANOVA. * for $p<0.05$;  for $p<0.01$; * for $p<0.001$ and **** for $p<0.0001$.

Figure 13:
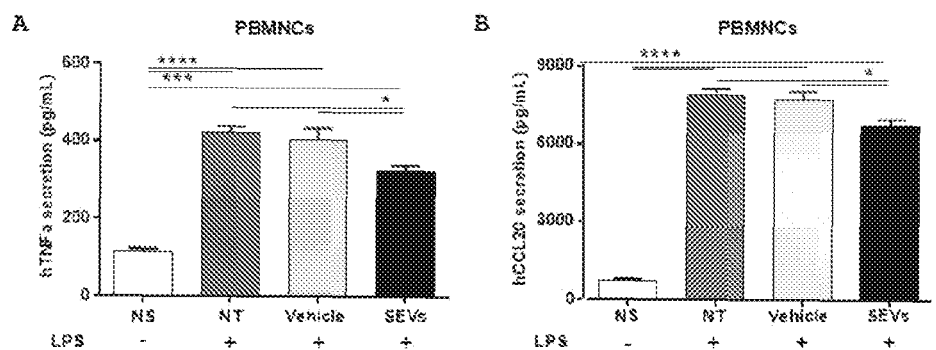

FIG. 13. SEVS decreases secretion of pro-inflammatory cytokines. PBMNCs were co-incubated with LPS (1 µg/mL) and Exo-101 ($1\times10^{10}$ part/mL) for 24h. After this time, the supernatant was collected and analysed by ELISA.
A. human TNF-a secretion by PBMNCs;
B. human CCL20 secretion by PBMNCs.

Results are presented as mean±SEM (n=3 for SEVs and n=1 for PBMNCs donor). Statistical analysis was performed using one-way ANOVA. * for $p<0.05$;  for $p<0.01$; * for $p<0.001$ and **** for $p<0.0001$.

Figure 14:
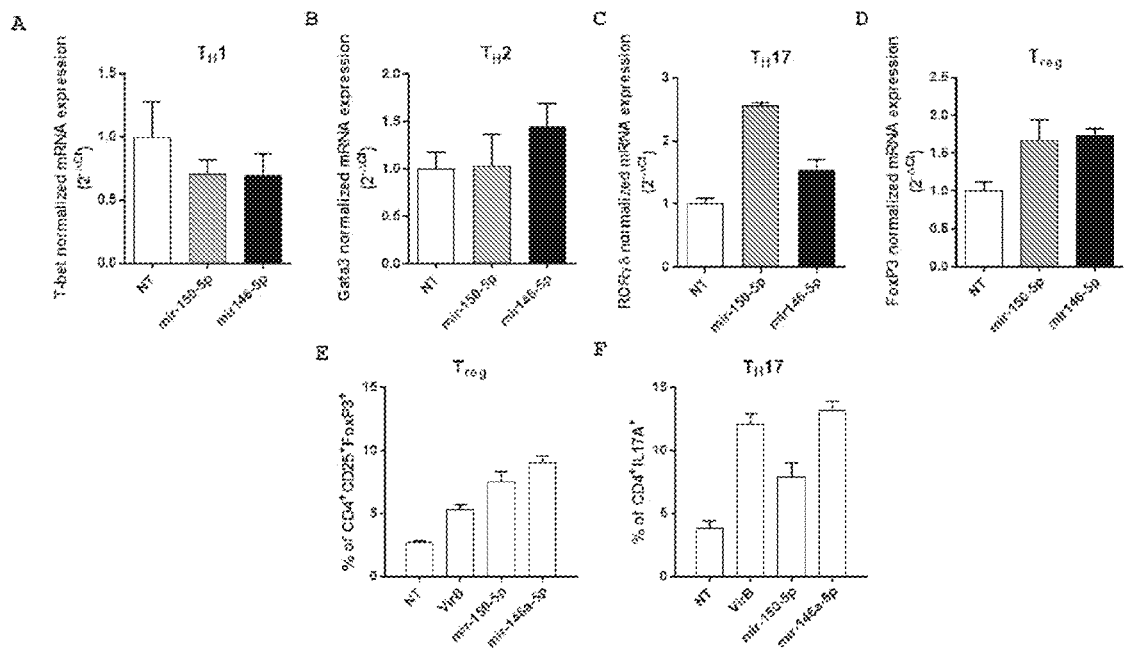

FIG. 14. Impact of miR-150-5p and miR-146-5p on lymphocytes expression profile. Healthy blood donors PBMNCs were transfected with both miR using Viromer Blue. 2 days after transfection, lymphocyte compartment was sorted based on morphological features (FSC and SSC) and total RNA was extracted. Gene expression analysis was performed using β-actin as reference gene. The normalized expression levels were calculated based on $2^{-\Delta\Delta Ct}$.
A. mRNA expression of $T_H1$ master transcription factor t-bet;
B. mRNA expression of $T_H2$ master transcription factor Gata3;
C. mRNA expression of $T_H17$ master transcription factor RORgt;
D. mRNA expression of Treg master transcription factor FOXP3.
E. Percentage of regulatory T cells 6 days after PBMNCs transfection. Treg were identified as CD4+CD25+FoxP3+.
F. Percentage of $T_H17$ 6 days after PBMNCs transfection. $T_H17$ were identified as IL17A expressing cells.

Results are presented as mean±SEM (n=3 for SEVs and n=1 for PBMNCs donor). Statistical analysis was performed using one-way ANOVA. * for $p<0.05$;  for $p<0.01$; * for $p<0.001$ and **** for $p<0.0001$.

Figure 15:
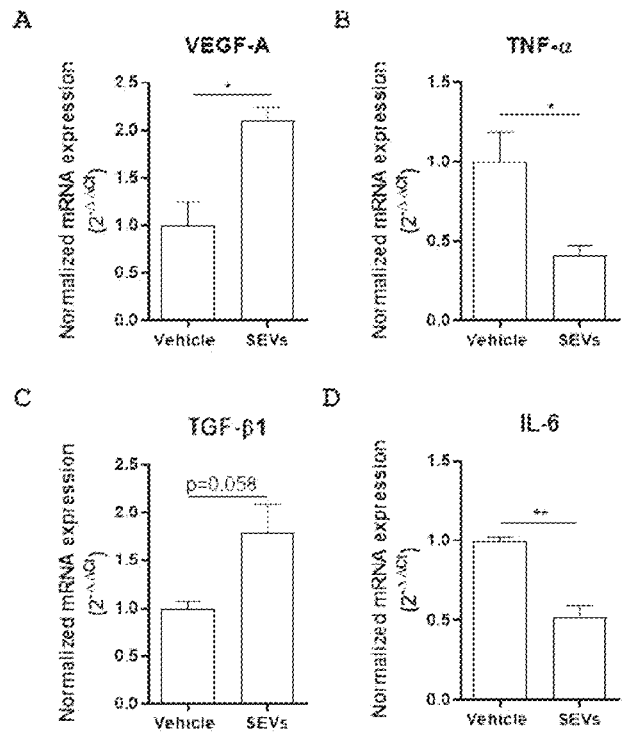

FIG. 15. SEVs effect on a psoriatic like-NHEK cell model. NHEK were terminally differentiated for 3 days with 2 mM of $CaCl_2$. Then, IMQ was added for 3h in order to potentiate their pro-inflammatory phenotype. Finally, treatment was administrated in co-incubation with IMQ for 3h and cells were collected for RNA extraction. 500 ng of RNA was used for reverse transcription reaction. mRNA expression was normalized by b-actin expression gene. Gene expression was assessed for (A) VEGF-A; (B) TNF-a; (C) TGF-b1 and (D) IL-6. Results are presented as mean±SEM (n=3 for SEVs). Statistical analysis was performed using student t-test. * for $p<0.05$; ** for $p<0.01$.

Figure 16:
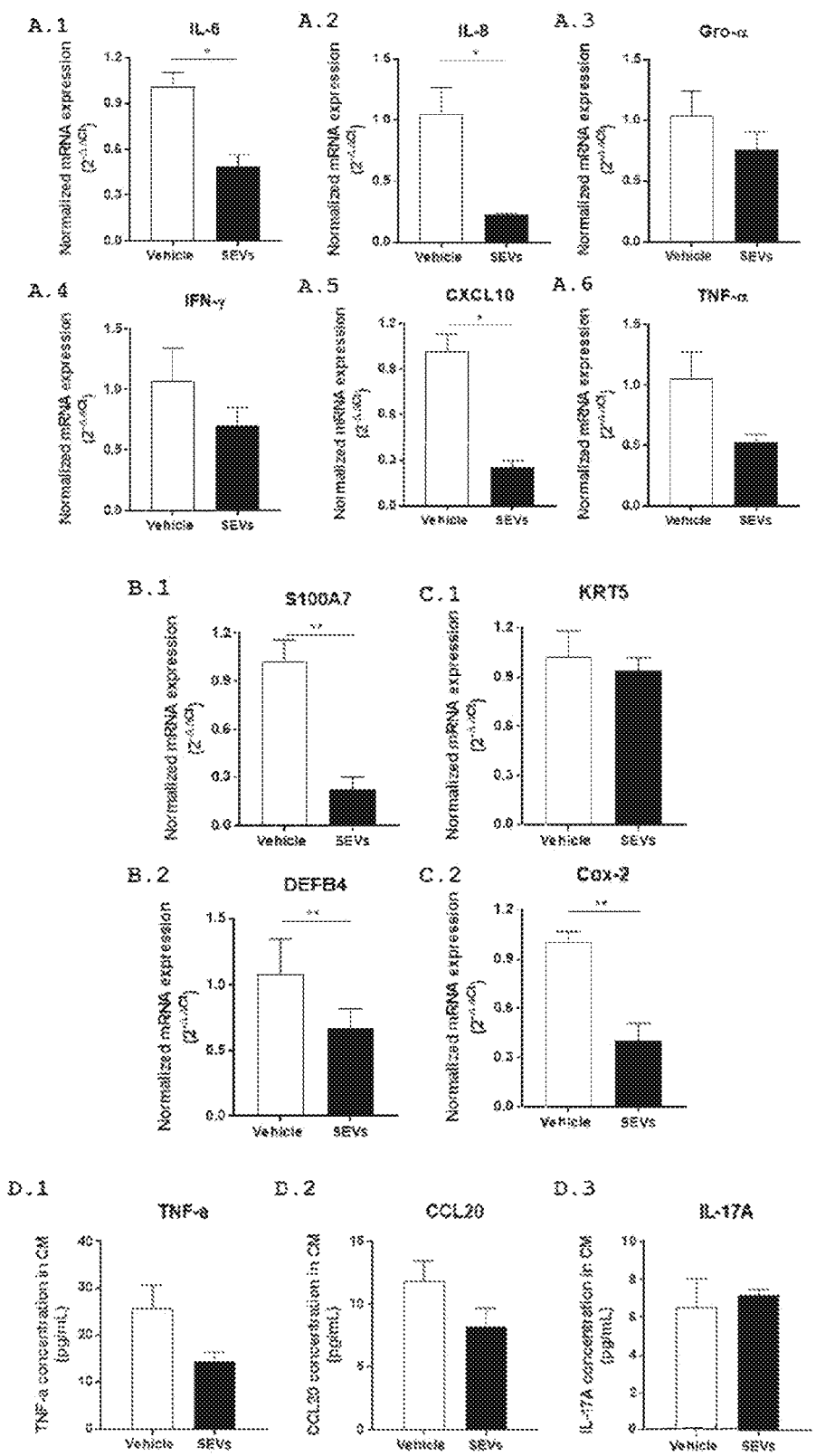

FIG. 16. SEVs bioactivity on a three dimensional epidermal psoriatic like model. After 5 days of treatment (twice a day with SEVs ($2.5\times10^9$ part/mL), RNA was extracted using RNAeasy Mini Kit (Qiagen) according to manufacture recommendations. 500 ng of RNA was used for reverse transcription reaction. mRNA expression was normalized by b-actin expression gene (n=3 for each condition).
A. Gene expression profile of pro-inflammatory mediators: (A1) IL6; (A2) IL8; (A3) Gro-a; (A4) IFNg; (A5) CXCL10 and (A6) TNF-a.
B. Gene expression profile of antimicrobial peptides: (B1) IL6; (B2) IL8;
C. Gene expression profile of (C1) KRT5 and (C2) Cox-2.
D. Protein secretion measured in CM of epidermal psoriatic-like keratinocytes by ELISA: (D1) TNF-a, (D2) CCL20 and (D3) IL17A.

Results are presented as mean±SEM (n=3 for SEVs). Statistical analysis was performed using student t-test. * for $p<0.05$; ** for $p<0.01$.

Figure 17:
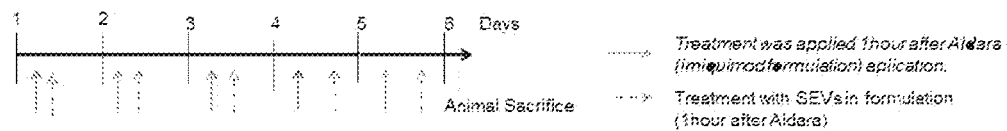
Figure 17:
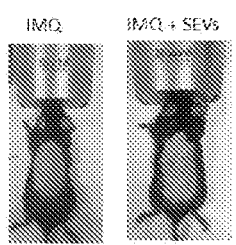
Figure 17:
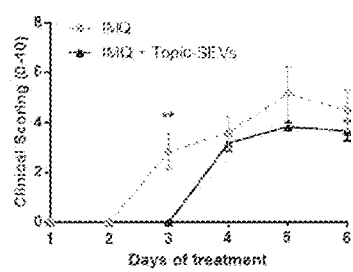
Figure 17:
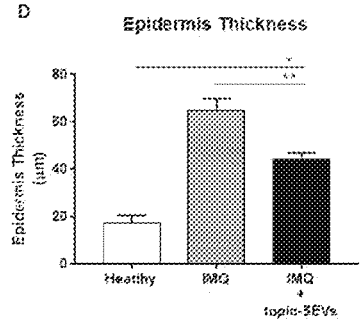

FIG. 17. Topic-SEVs ameliorated psoriatic characteristics in a psoriatic-like skin inflammation mice model.

A. C57BL/6J mice were used. Psoriatic like characteristics were induced by topical application of Aldara, a cream preparation containing 5% IMQ, every day. After one hour of Aldara's applications, SEVs treatment was applied in a topical formulation every day. After six days, skin and lymph node biopsies were collected for further analysis.
B. Representative photographs of the shaved skin on mice's backs after 6 days of topical treatment.
C. Clinical scoring was performed by ranking severity of erythema (redness from 0 to 4), affected area (0-3) and desquamation (scale from 0-2).
D. Epidermis thickness was measured in HE staining after 6 days of topical treatment.

Figure 18:
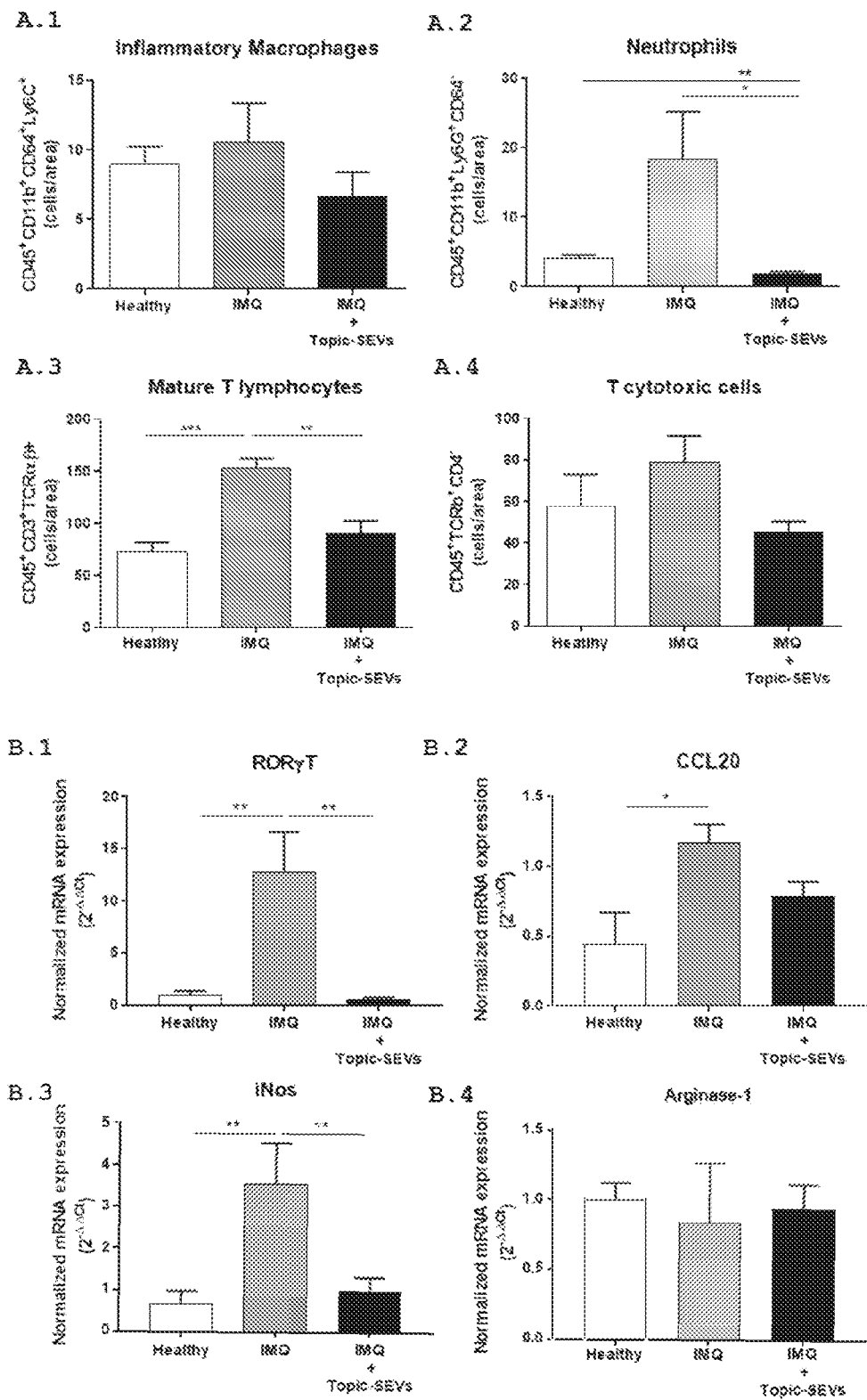

FIG. 18. Topic-SEVs bioactivity on skin cells in a psoriatic-like skin inflammation mice model.
A. Flow cytometry analysis of (A.1) inflammatory macrophages defined as $CD45^+CD11b^+CD64^+Ly6C^+$ (A.2) neutrophils ($CD45^+CD11b^+CD64^-Ly6C^+$) (A.3) mature T cells ($CD45^+CD3^+TCR\alpha\beta^+$) and (A.4) cytotoxic T cells $CD45^+TCR\alpha\beta^+CD4^-$). This analysis was performed after enzymatic digestion of skin biopsies.
B. Normalized mRNA expression of (B.1) RORgt, (B.2) CCL20, (B.3) iNos and (B.4) arginase. After skin digestion, skin cells RNA was extracted for RT-PCR analysis.

Results are presented as mean±SEM (n=6). Statistical analysis was performed using one-way ANOVA. * for $p<0.05$; ** for $p<0.01$.

Figure 19:
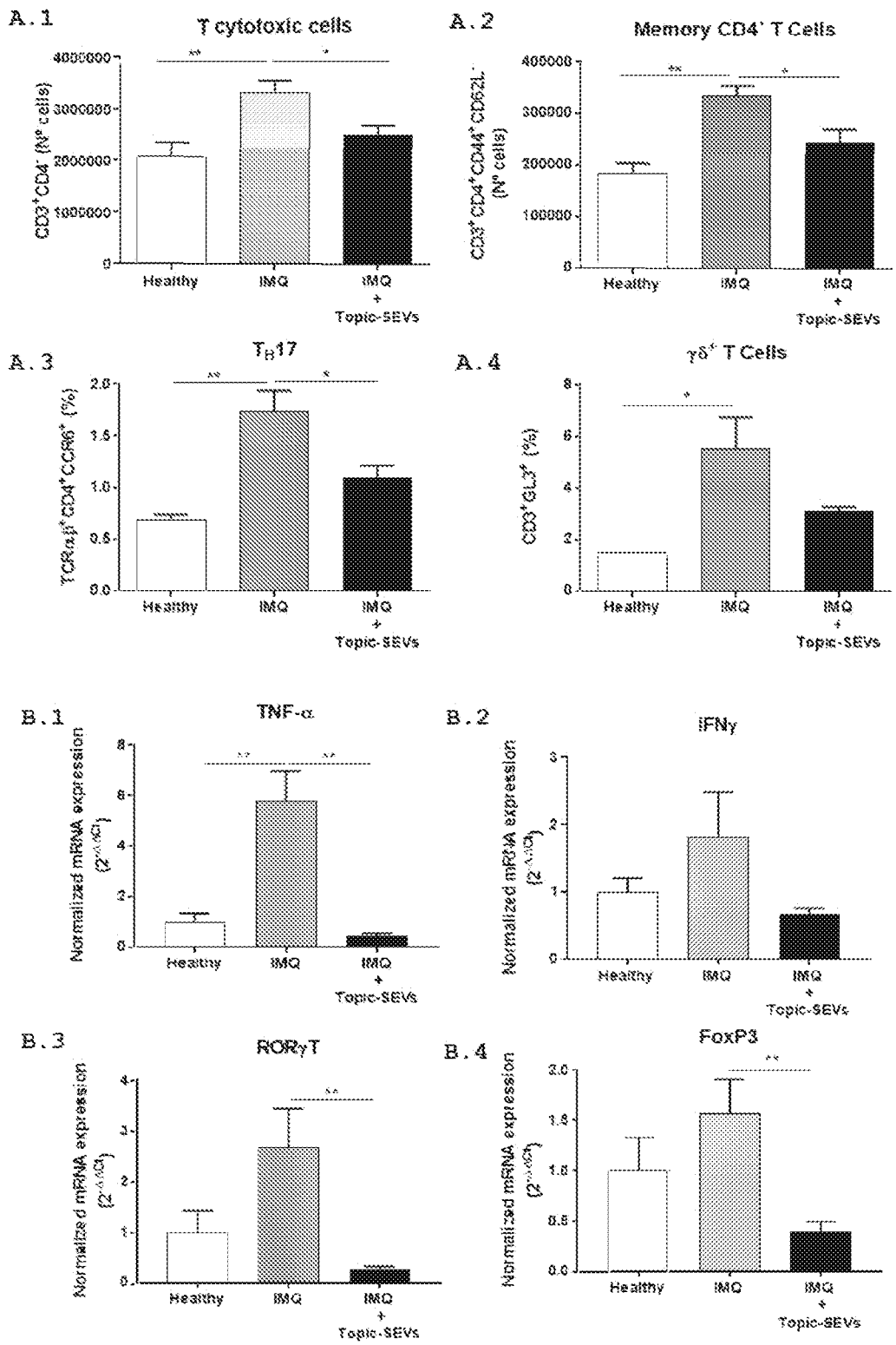

FIG. 19. Topic-SEVs bioactivity on lymph nodes cells in a psoriatic-like skin inflammation mice model.
A. Flow cytometry analysis of (A.1) the number of cytotoxic T cells ($CD3^+CD4^-$), (A.2) the number of memory T cells ($CD3^+CD4^+CD44^+CD62L^-$), (A.3) the percentage of $T_H17$ ($CD4^+TCR\alpha\beta^+CCR6^+$) and (A.4) the percentage of $\gamma\delta$ T cells ($CD3^+GL3^+$) present in lymph nodes. This analysis was performed after lymph node tissue dissociation.
B. Normalized mRNA expression of (B.1) TNF-a, (B.2) IFNg, (B.3) RORgt and (B.4) FOXP3 was evaluated in lymph nodes. After tissue dissociation, lymph node RNA was extracted for RT-PCR analysis. Results are presented as mean±SEM (n=6). Statistical analysis was performed using one-way ANOVA. * for $p<0.05$; ** for $p<0.01$.

Figure 20:
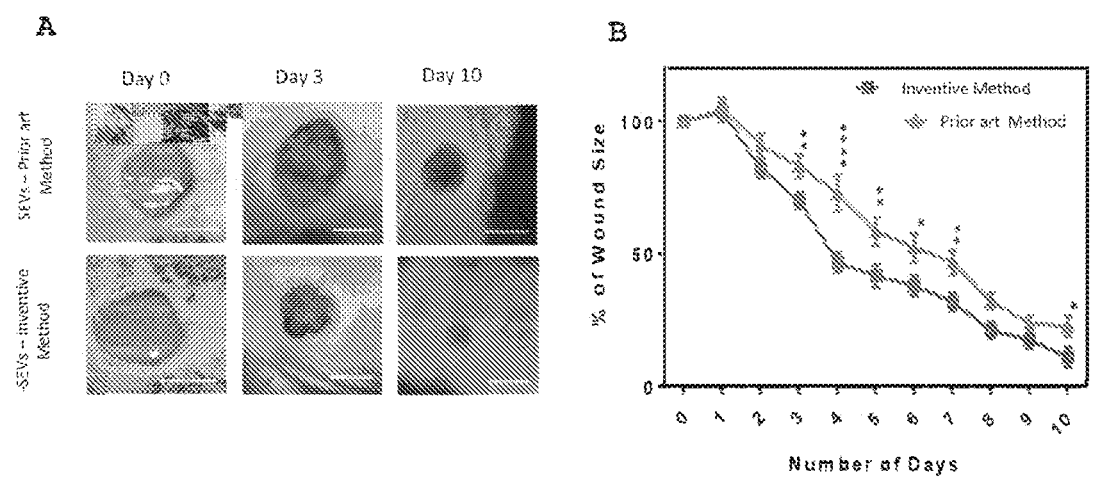

FIG. 20. SEVs isolated by the inventive method accelerate wound healing in a diabetic mouse model.

Full-thickness excisional wounds were performed on the skin of 16 chemically diabetes-induced C57BL/6 mice after 50 days of induction with STZ (50 mg/kg). Each mouse was randomly assigned to each treatment group: Inventive Method or Prior art Method. SEVs treatment was topically applied twice a day for 15 days. (A) Representative wounds micrographs of each condition at day 0, 3 and 10. Scale bar: 0.5 cm. (B) Arithmetic mean and SEM (n≥12) of the wound size percentage for all the mice, at each time point (every day). *$p\leq0.05$, *$p\leq0.01$, *$p\leq0.0001$.

DESCRIPTION OF THE INVENTION

The present invention relates to a process for isolating Small Extracellular Vesicles secreted by umbilical cord blood mononuclear cells (UCBMNCs) and compositions comprising Small Extracellular Vesicles obtained by processing said cells, which are useful to be applied to autoimmune and/or immune-system diseases therapeutics or prophylactics and/or cosmetic purposes.

1. Process for Isolating Mononuclear Cells Umbilical Cord Blood Small Extracellular Vesicles The process of the present invention can be applied to isolating Small Extracellular Vesicles secreted by umbilical cord blood mononuclear cells (UCBMNCs). This process aims to achieve highly pure Small Extracellular Vesicles and in a higher yield.

It comprises i) a first step of sequential centrifugation, ii) a second step of microfiltration combined with ultrafiltration (UF), and iii) a final step of size exclusion chromatography (SEC).

In general, the process of the invention may be performed according to the following:

1.1 Collection and Processing of the UCBMNCs

Human cord blood samples can be obtained from healthy volunteer donors after providing their informed consent. Blood cells are then isolated by gradient centrifugation, for example being automatically processed through an Automated Cord Blood Processing system. During centrifugation, component stratification and separation occurs, and cord blood components (buffy coat, plasma, red blood cells) can be directed into separate sterile bags.

In summary, red blood cells (RBC) are transferred to a separate sterile bag, the buffy coat, which contains the mononuclear cell (MNC) rich layer that can be delivered to a separate sterile freezing bag, while the plasma remains in the processing bag.

Said UCBMNCs comprise lymphocytes, monocytes, neutrophils, eosinophils, and/or basophils.

It is known in the art that this automated process overcomes the manual processing limitations such as technical variability between users and inefficiency in the processing time and cost. More importantly, it does not compromise the cell viability and potency.

1.2 UCB Cell Culture

Cells can be cultured for a minimum period of approximately 18h with or without ischemia. UCBMNCs are cultured in a serum-free cell culture medium preferably supplemented with 10-1000 ng/ml of FMS-like tyrosine kinase-3 (Flt-3) and 10-1000 ng/ml stem-cell factor (SCF) without ischemia or preferable under ischemia conditions, for example of 0.5% $O_2$, and 5% $CO_2$, at 37° C. for 18 h.

Small Extracellular Vesicles secreted by cells subjected to ischemic conditions ($O_2<2\%$) are more effective in inducing tissue repair (especially when damage is perpetuated by local ischemia) than Small Extracellular Vesicles secreted by cells when not exposed to ischemic conditions. This is especially because they are enriched in biomolecules that promote neovascularization. Therefore, in a preferred embodiment of the invention, cells are cultured under ischemic conditions.

1.3 SEVs Isolation

Small Extracellular Vesicles (SEVs) secreted by umbilical cord blood mononuclear cells (UCBMNCs), directly the buffy coat obtained from the UCB automatic processing, are purified (isolated) using a three-step process, according to the present invention, wherein i) the medium is cleared from large particles and cell debris using two rounds of sequential centrifugations; ii) the cleared supernatant is subjected to sequential micro (MF) and ultrafiltration (UF) techniques, to eliminate vesicles and other particles with more than 200 nm and less then 100 kDa in size; and iii) the final separation step with high performance exclusion chromatography (SEC), which further separates the isolated SEVs and eliminates small soluble proteins.

Figure 1:
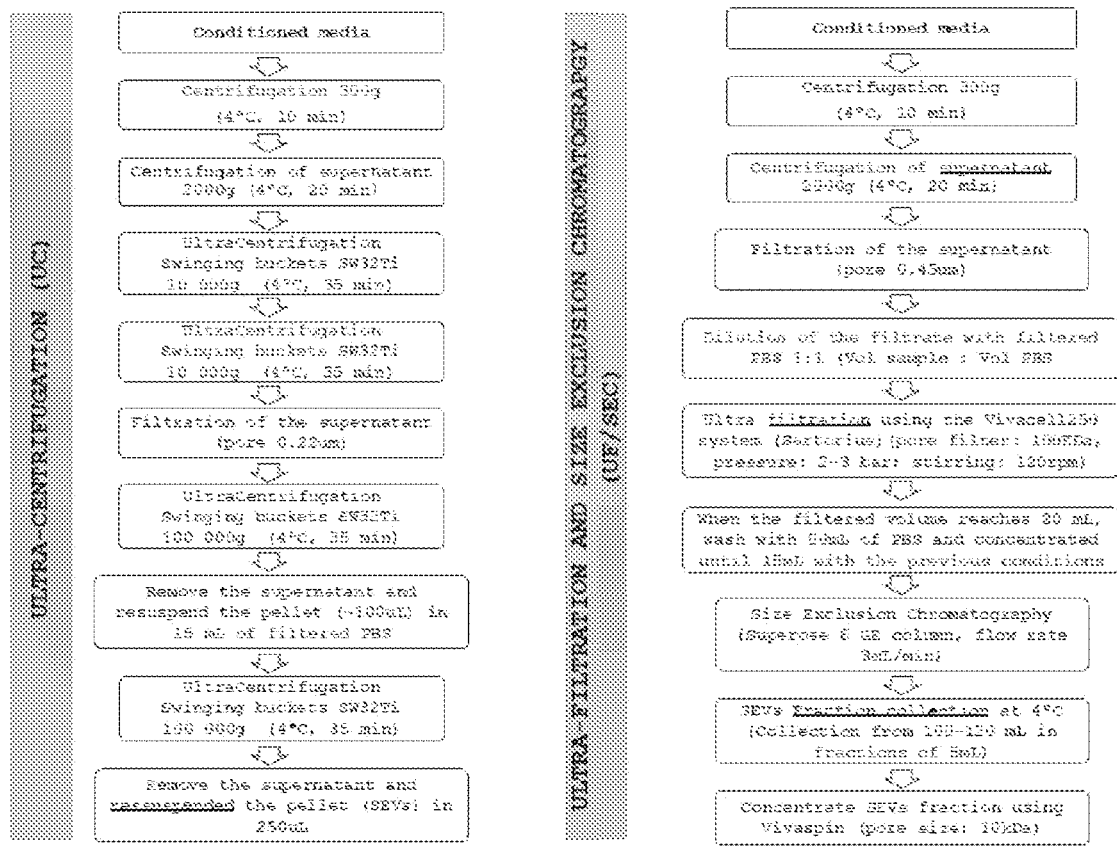
FIG. 1. Detailed methodology of (left panel) the prior art process (UC) and (right panel) the implemented GMP-Compliant method (UF/SEC).

A preferred embodiment of the process of the invention is described in FIG. 1, also including comparison with the prior art method used for SEVs isolation (Ultracentrifugation, UC).

Initially, the medium is cleared from large particles and cell debris using two rounds of sequential centrifugations typically performed first at low speed (200 g-400 g, 10-20 min), followed by average speed (1500 g-2500 g, 20-30 min), at a low temperature (4-10° C.), thus resulting in a cleared Conditioned Medium.

Afterwards, the collected Conditioned Medium is microfiltered either manually, or using automated systems such as including a peristaltic pump (<1 Bar) by performing a sequentially filtration using a first filter with a pore filter of 800 nm-450 nm followed by another filtration using a second smaller filter with pore filter of 250 nm-200 nm. This filtration step can also be performed by an apparatus combining both above mentioned filters.

This filtered solution is preferably then diluted with a phosphate buffer saline (PBS) in a ratio of at least 1:1.

The resulting solution is then subjected to an ultrafiltration step. This can be done by using a Vivacell® 250 system, under pressure of 2-4Bar, preferably 3-3,5Bar, and constant stirring conditions of 100-200 rpm. A tangential field flow system, using a molecule size cut-off of 100 KDa is also adequate for said purpose.

This result in a concentrated solution of particles bigger than 100 KDa and smaller than 200 nm, including SEVs.

The concentrated solution is then preferably washed 1 time with a PBS solution in a ratio of at least 1:4, respectively, and concentrated again to a minimal volume compatible with the following purification steps, preferably at least 10× less the initial volume.

The final isolation step uses high-performance size exclusion chromatography (SEC).

This step can be performed in a suitable equipment for SEC, such as a FPLC– Akta Avant Chromatographic system, or equivalent. A filtered PBS solution is used as elution buffer at a compatible flow rate, according to the SEC column used (0.5 mL/min in Superose 6 10/300 GL; 3 mL/min in XK 26/70).

UV absorbance was detected at three different wavelengths (220, 260 and 280 nm), while the 280 nm is used as the preferred signal for the SEVs detection.

Two individualized peaks can be observed in the chromatogram, and the SEVs are present in the first eluted peak (particles bigger in size). The second peak detected corresponds to smaller soluble proteins that are still present in the injected solution.

SEVs start to be collected when the absorbance at 280 nm increases in the first peak, and collection ends when the absorbance at 280 nm of that peak goes down to zero.

Figure 2:
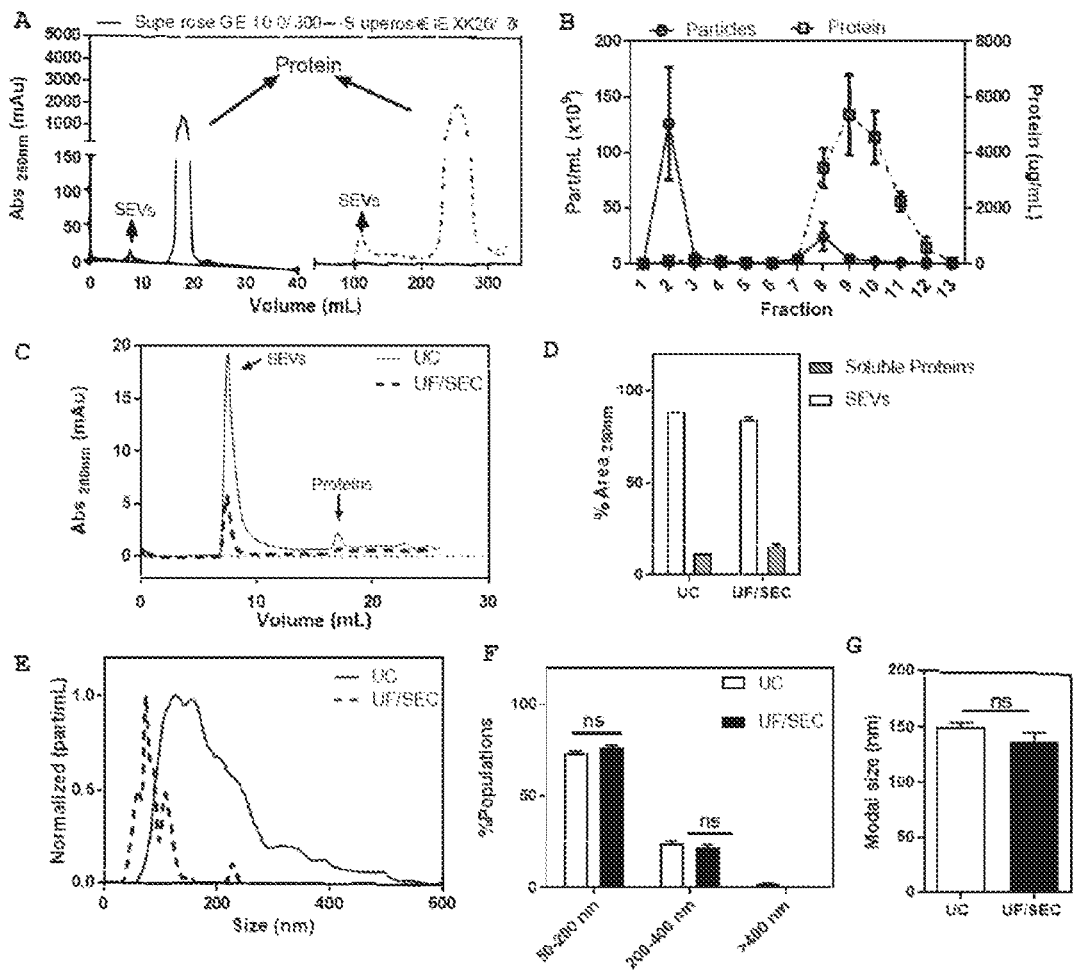
FIG. 2. Characterization of SEVs isolated by the prior art process (UC) and by the optimized method (UF/SEC), according to one of the preferred embodiments of the invention, where:
A. Chromatogram of the SEVs purification using the XK 26/70 (dashed line) and the Superose 10/300 GL (continuous line);
B. Represents Nanoparticle Tracking Analysis (NTA) particles distribution and Protein concentration of the fractions collected in UF/SEC;
C,D. Represent a characterization by HPLC of SEVs compositions-contaminants in both methodologies;
E. Represents a size distribution of SEVs in UC and UF/SEC by NTA;
F. Represents the population distribution obtained in NTA for SEVs isolated by UC and UF/SEC;
G. Represents a modal size of SEVs obtained by NTA.

Accordingly, SEVs fraction corresponds to elution volumes between 8-10 ml in Superose GE 100/300 and to 100-120 ml in Superose GE XK 26/70 (FIG. 2A). SEVs can be collected using a refrigerated (4-10° C.) automatic fraction collector coupled with the equipment.

Analysis of the collected fractions by Nanoparticle Tracking Analysis (NTA) and measurement of Protein Concentration is used to confirm the presence of SEVs in the isolated samples. SEVs correspond to higher number of nanosized particles with low protein concentration, while contaminant soluble proteins of the second peak correspond to low number of nanosized particles with high protein concentration (FIG. 2B).

The SEVs isolated according to the optimized methodology (UF-SEC) of the invention have similar morphological characteristics when compared with SEVs isolated according to the described prior art process (UC).

SEVs were evaluated by FPLC techniques in function of their individual amounts and types in the resulting compositions, i.e. SEVs species, and it was observed that the contamination with soluble proteins is less than 20%, which is very similar to the prior art UC methodology (FIGS. 2C and 2D). These results show that in respect to the retention of contaminant soluble proteins the process of the invention (UF-SEC) is as good as the process of the prior art (UC).

Nanoparticle Tracking Analysis (NTA technique) is used to analyse the size distribution of the isolated SEVs. The profile of the curve is centred in sizes below 200 nm, and the average size obtained is close to 150 nm (FIG. 2E). These results are compatible with the expected size of SEVs, that is reported in the literature to be within 50-200 nm. These results show that in respect to the size of isolated SEVs, the process of the invention (UF-SEC) is as good as the process of the prior art (UC).

Presence of microvesicles (200-400 nm) in the isolated SEVs fractions is within 5-25% (FIG. 2F), while larger particles (>400 nm) represent less than 5%. Modal size of the SEVs is around 150 nm, using the optimized methodology (UF-SEC) or the prior art method (UC) (FIG. 2G). These results show that in respect to the size of isolated SEVs, the process of the invention (UF-SEC) is as good as the process of the prior art (UC).

The yield in number of isolated SEVs is higher when using the optimized methodology (UF-SEC) of the invention, comparing to the prior art method (UC), independently of the normalization used: (i) per millilitre of conditioned medium used (FIG. 3A), (ii) per number of Mononuclear Cells (MNCs) (FIG. 3B) or (iii) per total number of nucleated cells (FIG. 3C).

These results show that in respect to SEVs yield the process of the invention (UF-SEC) is superior than the process of the prior art (UC).

1.4 SEVs Pooling

Small Extracellular Vesicles are pooled from several blood donors and are characterized according to optimized techniques and standards. The pooling can be made from at least 5 different donors, using the cell culture conditioned medium, or after the purification of the Small Extracellular Vesicles. Using this strategy, it is possible to increase the homogeneity between the purified Small Extracellular Vesicles, without affecting their bioactive properties.

1.5 Lyophilisation

A lyophilisation step may be added to the general process in order to produce a storable product and/or to produce compositions that can be used in later occasions.

Lyophilisation is a dehydration process through the sublimation process. This controlled drying process removes the water, leaving the molecular structure of the product intact. Given that the desired final product can be a lyophilized formulation, tests were performed to access whether lyophilisation could affect the stability and biochemical/biophysical characteristics of the SEVs compositions or fractions. The lyophilisation can be performed for approximately 12-24h depending on the volume with a pressure<0.4 mBar and temperature of approximately −50° C.

In terms of morphological characteristics of the extracellular vesicle compositions after lyophilization, 5 pools were tested, each containing 5 different blood donors. It was observed that the impact of lyophilisation is negligible. Both the modal size and the concentration seem not to be affected by the lyophilisation procedure, indicating that they are maintained stable in the process and are well hydrated by our solvent. The relative expression of surface markers is also not significantly affected by the lyophilisation, being an indication that the surface properties are conserved throughout the procedure.

2. Method for Small Extracellular Vasicles (SEVs) Modification

Isolated Small Extracellular Vesicles (SEVs) can be modified to increase their bioactive efficiency.

These modifications may be done by pre-conditioning the secreting cells (UCBMNCs) with specific stimuli, or directly in the SEVs compositions after isolation with the process of the invention (UF-SEC).

In the present invention, a post-isolation modification is preferred. For this purpose, SEVs compositions obtained by the UF-SEC methodology are enriched with specific molecules, such as selected miRNAs, which are responsible or involved in the process of treating and/or preventing certain diseases, such as inflammatory and autoimmune diseases, or in cosmetic applications.

The obtained SEVs compositions that can be presented either in liquid or in powder form.

In a preferred embodiment of the invention, SEVs are modified with selected types of miRNA by direct hydration of the lyophilized powder composition of SEVs with a miRNA solution (FIG. 4).

Lyophilized SEVs compositions having $1 \times 10^9 - 1 \times 10^{11}$ particles/mL, preferably $1 \times 10^{11}$, are directly rehydrated with the same volume of a miRNA solution of 0.2-10 uM, preferably 0.25-5.0 µM, more preferably 0.5-1 µM in water, or a buffer solution with neutral pH, such as PBS, and 3 cycles of incubation at 37° C. for 2 min are performed, each cycle followed by vortex.

Therefore, the method for SEVs modification with miRNA molecules comprise the following steps:
 a) Providing a powder composition of SEV to be modified;
 b) Direct hydration of the SEVs composition with a solution of selected miRNA comprising an amount of miRNA of 0.2-10 µM, preferably 0.25-5.0 µM, more preferably 0.5-1 µM in water, or a buffer solution with neutral pH, such as PBS,
 c) Incubation of the mixture in 3 cycles at approximately 37° C. for around 2 min, each cycle followed by vortex.

Optionally, a filtration step is added to the above method performed with a 10-100 kDa, preferably 20-70 kDa, more preferably 40-50 kDa molecule cut-off to separate the non-incorporated miRNA, and three rounds of washing with water or a buffer solution with neutral pH, preferably with PBS are performed, typically with resuspension in a buffer solution with neutral pH, preferably PBS, centrifugation at 14000 g at 4° C., 4 min. The modified SEVs can then be collected by a known method in the art.

Another approach for Small Extracellular Vesicles enrichment was tested with the incorporation of a palmitoylated tripeptide, such as matrikine (MTK) in the SEVs compositions (FIG. 5).

Given that palmitoylated tripeptides, such as MTK, are lipid soluble molecules, the modification methodology as described above had to be adapted.

Therefore, the method for SEVs modification with palmitoylated tripeptides molecules comprise the following steps:
 a) Providing a powder composition of SEV to be modified;
 b) Direct hydration of the SEVs composition with a solution of selected palmitoylated tripeptides comprising concentrations between 10-60 uM in water, or a buffer solution with neutral pH, such as PBS;
 c) Incubation of the mixture for 1 h at 37° C.

The non-incorporated pal-tripeptide can be removed by a filtration step with a 10-100 kDa, preferably 20-70 kDa, more preferably 40-50 kDa molecule cut-off to separate the non-incorporated palmitoylated tripeptide, and three rounds of washing with PBS (resuspend in PBS, centrifuge at 14000 g at 4° C., 4 min), as described above.

3. Analysis of SEVs Modification

For accessing the validity of the described SEVs modification strategies, fluorescence miRNA and fluorescent MTK was incorporated into the SEVs powder composition.

Figure 3:
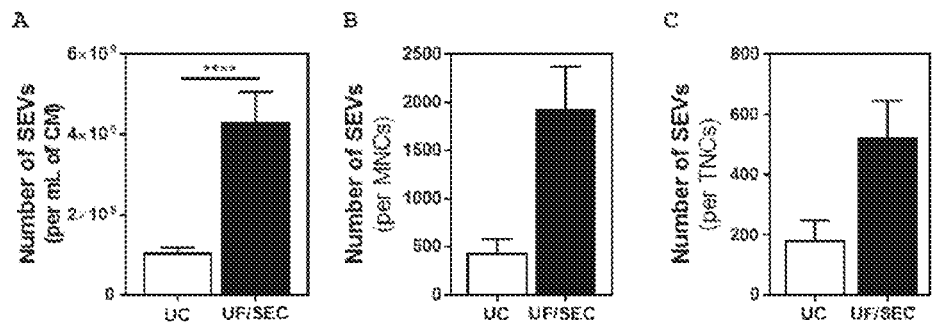
FIG. 3. Represents the yield of SEVs isolated by UC or UF/SEC, wherein:
A. Represents the number of extracellular cells per mL of conditioned media in SEVs isolated by UC and UF/SEC,
B. Represents the number of SEVs isolated per million Mononuclear Cells isolated by UC and UF/SEC, and
C. Represents the number of SEVs isolated per million Total Nucleated Cells isolated by UC and UF/SEC.

SEVs were modified by direct hydration as described above with fluorescent miRNA solution. In the reference solution (containing the free incorporated fluorescent miRNA), after the first centrifugation the fluorescence was not retained by the filter (fluorescence in the top compartment goes to zero), whilst the fluorescence in the SEVs composition was maintained at about 20% of the initial value (FIGS. 4B3 and 4B4).

In the washing of the filtration step the fluorescent SEVs were recovered by centrifugation after each washing step. The fluorescence was maintained in 20% after the three washings, which demonstrates an efficient incorporation of the fluorescent miRNA into the SEVs. To further evaluate the efficacy of the modifications with miRNA, real-time PCR is used to evaluate the amount of miRNA before and after the modification strategy.

For validation of incorporation of palmitoylated tripeptides, similarly to the miRNA validation methodology, a fluorescently modified palmitoylated tripeptides, MTK, was successfully incorporated in the SEVs compositions.

Therefore, in another embodiment of the present invention, the SEVs compositions are enriched with any of these biologically active molecules according to the method described above and with the respective adaptations for lipid soluble molecules and non-lipid soluble molecules.

4. Compositions Comprising Small Extracellular Vesicles Secreted by UCBMNCs

Compositions comprising the Small Extracellular Vesicles (SEVs) isolated by the process of the present invention (UF-SEC) were analysed and characterized according to groups of relevant elements contained therein, in particular proteins, RNA and lipids.

1.1 Proteins

The SEVs compositions were analysed by mass spectrometry to characterize their protein content. Protein concentrations of these compositions were determined by micro bicinchoninic acid assay (BCA) protein assay kit, and the total peptide material analysed using nanoscale liquid chromatography coupled to tandem mass spectrometry (nanoLC-MS/MS). Briefly, samples were lysed and loaded onto an (SDS-PAGE gel). The resulting gel lane was washed, and proteins were reduced in Dithiothreitol DTT before alkylation. After washing, in-gel digestion using trypsin was done and peptides were separated by liquid chromatography and identified by MS.

In total, 170 proteins were identified in the Small Extracellular Vesicles isolated according to the method of the present invention (see Table 1). There is superiority to the new compositions in terms of biological processes associated with regulation of the immune system and inflammatory response (Table 8), since in the prior art method (UC) a low percentage of proteins are associated to these biological processes (Ref. Table 8).

To understand the biological relevance of these 170 proteins, such as the biological pathways and molecular functions associated, Funrich software was used by introducing their Uniprot IDs and analysing using Funrich database. Table 2 summarizes the percentage of each group in relation to the complete list of proteins identified. Results show that proteins contained in the SEVs compositions have a strong predicted effect in biological processes related to wound healing and immunomodulation.

The proteins were grouped according to the biological processes that they influence, and Table 3 relates the identified proteins with their biological activity. For example, Funrich software predicted Sp1 as a transcriptional factor influenced by ANXA7, STOM, SLC2A1, DSP, JUP, ANXA11, UBA52 and GAPDH, all of them found in the SEVs composition. This transcriptional factor has been associated with a strong and stable induction of Foxp3 expression when activated which reinforces the possible immunomodulatory effect of the SEVs compositions.

TABLE 1

List of proteins identified in the SEVs compositions isolated with the present inventive method (UF-SEC)
Identified proteins in the SEVs compositions

| UniProt ID | Name | UniProt ID | Name | UniProt ID | Name |
|---|---|---|---|---|---|
| P0DOX2 | IGA2 | P46976 | GYG1 | P16157 | ANK1 |
| P0DOX7 | IGK | P69905 | HBA1 | P0C0L5 | C4B |
| P01871 | IGHM | P68871 | HBB | P31944 | CASP14 |
| P01619 | KV320 | P02042 | HBD | Q16778 | HIST2H2BE |
| Q5VTE0 | EF1A3 | P69891 | HBG1 | P01859 | IGHG2 |
| P01876 | IGHA1 | P69892 | HBG2 | Q05707 | COL14A1 |
| P04217 | A1BG | P02008 | HBZ | Q01518 | CAP1 |
| P01023 | A2M | P62805 | HIST4H4 | P02549 | SPTA1 |
| P63261 | ACTG1 | P00738 | HP | P16403 | HIST1H1C |
| P12814 | ACTN1 | P02790 | HPX | P00736 | C1R |
| P43652 | AFM | Q86YZ3 | HRNR | P0DOY2 | IGLC2 |
| P02765 | AHSG | P11142 | HSPA8 | P12273 | PIP |
| P02768 | ALB | P08514 | ITGA2B | Q96P63 | SERPINB12 |
| P04075 | ALDOA | P05106 | ITGB3 | P07478 | PRSS2 |
| P02760 | AMBP | P01591 | JCHAIN | P02649 | APOE |
| P04083 | ANXA1 | P14923 | JUP | Q14254 | FLOT2 |
| P50995 | ANXA11 | P01042 | KNG1 | Q08188 | TGM3 |
| P07355 | ANXA2 | P11279 | LAMP1 | P67936 | TPM4 |
| P12429 | ANXA3 | P31025 | LCN1 | Q06830 | PRDX1 |
| P08758 | ANXA5 | P07195 | LDHB | O43866 | CD5L |
| P08133 | ANXA6 | Q08380 | LGALS3BP | P08238 | HSP90AB1 |
| P20073 | ANXA7 | P02750 | LRG1 | Q9NZD4 | AHSP |
| O75882 | ATRN | P02788 | LTF | P01768 | HV330 |
| P25311 | AZGP1 | P61626 | LYZ | Q71DI3 | HIST2H3C |
| P30043 | BLVRB | Q08431 | MFGE8 | P40926 | MDH2 |
| P02745 | C1QA | P05164 | MPO | P19338 | NCL |
| P02746 | C1QB | P35579 | MYH9 | Q93077 | HIST1H2AC |
| P02747 | C1QC | P60660 | MYL6 | P01031 | C5 |
| P09871 | C1S | Q6UX06 | OLFM4 | P20618 | PSMB1 |
| P01024 | C3 | P07737 | PFN1 | O00299 | CLIC1 |
| P04003 | C4BPA | P14618 | PKM | P09105 | HBQ1 |
| P02748 | C9 | P55058 | PLTP | Q9UL46 | PSME2 |
| P00918 | CA2 | P02775 | PPBP | Q86TJ2 | TADA2B |
| P04040 | CAT | P62937 | PPIA | Q16610 | ECM1 |
| Q08722 | CD47 | P32119 | PRDX2 | P60900 | PSMA6 |
| P08962 | CD63 | P30041 | PRDX6 | P53396 | ACLY |
| P23528 | CFL1 | P05109 | S100A8 | P37802 | TAGLN2 |
| P10909 | CLU | P06702 | S100A9 | P35754 | GLRX |
| P31146 | CORO1A | P29508 | SERPINB3 | P29972 | AQP1 |
| P00450 | CP | P05155 | SERPING1 | P28072 | PSMB6 |
| P01040 | CSTA | P11166 | SLC2A1 | P28066 | PSMA5 |
| P08311 | CTSG | P02730 | SLC4A1 | P06331 | HV434 |
| P81605 | DCD | P11277 | SPTB | O75635 | SERPINB7 |
| P59666 | DEFA3 | P30626 | SRI | O75368 | SH3BGRL |
| Q02413 | DSG1 | P27105 | STOM | P59190 | RAB15 |
| P15924 | DSP | P02787 | TF | Q08554 | DSC1 |
| P60842 | EIF4A1 | P02786 | TFRC | P01743 | HV146 |
| P08246 | ELANE | P07996 | THBS1 | P80188 | LCN2 |
| P06733 | ENO1 | Q9Y490 | TLN1 | P05089 | ARG1 |
| P16452 | EPB42 | P24821 | TNC | O14818 | PSMA7 |
| P21333 | FLNA | P60174 | TPI1 | Q6ZVX7 | NCCRP1 |
| P02751 | FN1 | P62987 | UBA52 | P19652 | ORM2 |
| P04406 | GAPDH | P13611 | VCAN | P48059 | LIMS1 |
| P02774 | GC | P18206 | VCL | P29353 | SHC1 |
| P13224 | GP1BB | P31946 | YWHAB | P10599 | TXN |
| P06396 | GSN | P63104 | YWHAZ | Q5T749 | KPRP |
| O15511 | ARPC5 | P0DOX5 | IGG1 | | |

TABLE 2

Biological processes regulated by the proteins contained in Small Extracellular Vesicles isolated according to the method (UF-SEC) of the present invention (percentage of the total proteins identified which are associated to each biological process)

| Biological process | % proteins | p-value |
|---|---|---|
| neutrophil degranulation | 20.37 | P 0.004 |
| cell adhesion | 1.85 | P 0.72 |
| extracellular matrix organization | 1.85 | P 0.41 |
| leukocyte migration | 7.41 | P 1 |
| cellular protein metabolic process | 3.7 | P 1 |
| innate immune response | 9.26 | P 1 |
| regulation of complement activation | 12.96 | P < 0.001 |
| platelet degranulation | 5.56 | P 1 |
| Fc-gamma receptor signalling pathway involved in phagocytosis | 9.26 | P 0.0796 |
| receptor-mediated endocytosis | 9.26 | P 1 |
| inflammatory response | 7.41 | P 1 |
| complement activation, classical pathway | 12.96 | P 0.002 |
| complement activation | 11.11 | P 0.005 |
| immune response | 7.41 | P 1 |
| protein deubiquitination | 12.96 | P 0.187 |
| Fc-epsilon receptor signalling pathway | 7.41 | P 1 |
| keratinization | 5.56 | P 1 |
| MAPK cascade | 3.7 | P 1 |
| NK-kB signalling | 10.71 | P < 0.001 |
| T cell receptor signalling pathway | 10.71 | P < 0.001 |

TABLE 3

Biological activity of the identified proteins in the SEVs compositions

| Biological funtion | Number Proteins | UniProt ID Code |
|---|---|---|
| neutrophil degranulation | 47 | P00738; P68871; P05164; P01024; P18206; P07355; P27105; Q02413; P11142; P04040; P02765; P02788; P05109; P04075; P15924; P30041; P04217; P08311; P14618; Q01518; P02775; Q96P63; P14923; P07478; P02750; P12429; P08238; P08246; P06702; P06396; P61626; Q08722; P29508; P20618; P53396; P28066; O15511; Q08554; P46976; P80188; P05089; P62937; P08962; Q86Y23; P11279; P19652; Q6UX06; |
| platelet degranulation | 24 | P01023; P02768; Q9Y490; P02751; P21333; P02787; P18206; P02765; Q08380; P04075; P10909; P08514; P04217; P12814; P02775; P07996; P08758; P05106; P01042; P05155; Q16610; P37802; P08962; P19652; |
| complement activation, classical pathway | 19 | P01871; P01024; P02748; P02747; P0C0L5; P02746; P04003; P10309; P01876; P01859; P02745; P09871; P00736; P01768; P01031; P05155; P01619; P06331; P01743; |
| innate immune response | 19 | P01871; P04063; P02747; P0C0L5; P05109; P62987; P02746; P04003; P10909; P01876; P59666; P01859; P02745; P00736; P01591; P06702; P05155; P31146; P80188; |
| cell adhesion | 15 | P02751; P24821; P18206; P13611; Q08380; Q06431; P25311; P08514; P07996; Q14254; P05106; Q08722; P13224; P02760; Q6UX06; |
| complement activation | 14 | P01024; P02747; P0C0L5; P02746; P10909; P01859; P02745; P09871; P00736; P01768; P01031; P01619; P06331; P01743; |
| receptor-mediated endocytosis | 14 | P02768; P00738; P69905; P68871; P02790; P01876; Q01518; P02649; P01591; P01768; P01619; P06331; P01743; P02790; P02760; |
| inflammatory response | 13 | P01024; P04083; P0C0L5; P05109; O75882; P02775; P07996; Q43866; P06702; P61626; P01042; P01031; Q16610; |
| leukocyte migration | 13 | P02751; P01871; P35579; P01876; P01591; P05106; P01768; Q08722; P01619; P06331; P01743; P62937; P29353; |
| negative regulation of apoptotic process | 13 | P02768; P05164; P21333; P32119; P63104; P04083; P04040; P02788; P62987; P07996; P08758; P29972; P23528; |
| Fc-epsilon receptor signaling pathway | 12 | P62987; P01768; P20818; P01619; Q9UL46; P60900; P28072; P28066; P06331; P01743; Q14818; P29353; |
| immune response | 12 | P01024; P02747; P01876; P08311; P02775; P00736; P07996; P01591; P01768; P01619; P06331; P01743; |

To refine the proteomic analysis, SEVs samples were segmented in three fractions increasing the dynamic range of MS analysis to identify the less abundant peptides. In addition to the above listed proteins, SEVs purified by the process of the present invention (UF-SEC) are also composed by classical SEVs markers as tetraspanin like CD9, CD63 and CD82, integrins (integrin alpha-2; integrin alpha-IIb; integrin alpha-4; integrin alpha-M; integrin beta-1; integrin beta-2 and integrin beta-3) and Rab proteins.

2.2 RNA

RNA sequencing was used to identify the small RNA content of the SEVs compositions. SEVs RNA was isolated using EXIQON miRCURY™ Isolation kit (Cell & Plants) and small RNA quality and quantification was performed in Bioanalyzer 2100.

In the scope of the present invention the expression "small RNA content" means a composition comprising RNA molecules having less than 200 nucleotides in length, and "miRNA", "microRNA" or "miR" means a RNA molecule with approximately 21-25 nucleotides.

A small library was constructed using small RNA according to Ion Total RNA-Seq Kit v2 protocol. The pooled libraries were further processed on Ion Chef™ System and the resulting 530™ chip was sequenced on Ion S5™ System. Cufflinks tool was used for annotation and estimation of the relative abundance of each gene in each sample.

Results show that SEVs isolated according to the process of the present invention have different species of small RNAs, with transference RNA being the most abundant RNA species, representing in average 57%. MicroRNAs (miRNA) are the second most predominant specie (~27%) followed by ribosomal RNA (~6%) and other minor categories. Table 4 shows the small RNAs identified in the SEVs compositions and their correspondent contribution in respect to the total of annotated RNA sequences.

TABLE 4

Percentage of small RNA species in the SEVs compositions

| SMALL RNA | AVERAGE (% of total annotated) | Standard Deviation |
|---|---|---|
| snRNA | 1.99 | 1.08 |
| snoRNA | 1.47 | 0.98 |
| rRNA | 6.19 | 0.97 |
| microRNA | 26.47 | 5.40 |
| tRNA | 57.23 | 6.87 |
| Other | 6.65 | 1.23 |

Amongst the 6 analysed samples, there are no major differences in RNA species. Accordingly, a range of miRNA can be defined as shown in Table 5. In the SEVs compositions, 227 RNAs were detected in at least 5 different samples, of which 44 are miRNA. Interestingly, 20 of those miRNA identified are exclusive of SEVs isolated with the new inventive method (miRNAs in bold in table 5).

TABLE 5

List of the miRNA commonly identified in the SEVs compositions. In bold, in the bottom of the list are presented miRNA species identified exclusively in SEVs preparations isolated with the inventive method.
miRNA identified

| | | |
|---|---|---|
| hsa-let-7a-5p | hsa-miR-15a-5p | hsa-miR-21-5p |
| hsa-let-7f-5p | hsa-miR-15b-5p | hsa-miR-223-3p |
| hsa-let-7g-5p | hsa-miR-16-5p | hsa-miR-23a-3p |
| hsa-miR-103a-3p | hsa-miR-17-5p | hsa-miR-26a-5p |
| hsa-miR-106b-5p | hsa-miR-191-5p | hsa-miR-26b-5p |
| hsa-miR-142-3p | hsa-miR-19a-3p | hsa-miR-29b-3p |
| hsa-miR-146a-5p | hsa-miR-19b-3p | hsa-miR-30d-5p |
| hsa-miR-150-5p | hsa-miR-20a-5p | hsa-miR-451a |
| hsa-let-7b-5p | hsa-miR-185-5p | hsa-miR-30b-5p |
| hsa-let-7c-5p | hsa-miR-18a-5p | hsa-miR-3184-3p |
| hsa-let-7i-5p | hsa-miR-205-5p | hsa-miR-376c-3p |
| hsa-miR-130a-3p | hsa-miR-221-3p | hsa-miR-486-5p |
| hsa-miR-144-3p | hsa-miR-22-3p | hsa-miR-92a-3p |
| hsa-miR-144-5p | hsa-miR-27a-3p | hsa-miR-93-5p |
| hsa-miR-181a-5p | hsa-miR-27b-3p | |

1.3 Lipids

Given that Small Extracellular Vesicles are surrounded by a lipid bilayer, they are considered not only an important structural component of Small Extracellular Vesicles, but they are also expected to modulate Small Extracellular Vesicles interaction with recipient cells. To have some insight regarding the lipid content of the compositions of the present invention mass spectrometry was used to measure and identify their lipid profile. Lipids were extracted using chloroform and methanol, according to the methodology of Sampaio J L, PNAS 2011.

Samples were spiked with lipid class-specific internal standards prior to extraction. After drying and resuspending in Mass Spectrometry acquisition mixture, lipid extracts were subjected to mass spectrometric analysis. Mass spectra were acquired on a hybrid quadrupole/Orbitrap mass spectrometer equipped with an automated nano-flow electrospray ion source in both positive and negative ion mode.

In terms of total lipid quantity, it was observed that the compositions have approximately 12000 pmol with a variability between samples of 25%, with phosphatidylcholines (PC) and phosphatidylserines (PS) as the major lipid classes (~60%), followed by Sphingomyelin (SM, 20%) as shown in Table 6.

TABLE 6

Percentage of lipids in SEVs compositions. CE-cholesteryl esters; DAG-diacylglycerol; PA-phosphatidic acid; PC-phosphatidylcholine; PE-phosphatidylethanolamine; PG-phosphatidylglycerol; PI-phosphatidylinositol; PS-phosphatidylserine; SM-sphingomyelin; TAG-triacylglycerol.

| Lipid | Percentage of Total Lipids (%) |
|---|---|
| CE | 0.05 ± 0.05 |
| DAG | 1.3 ± 0.4 |
| PA | 3.18 ± 0.6 |
| PC | 30.9 ± 3.3 |
| PE | 13.0 ± 0.5 |
| PG | 0.25 ± 0.1 |
| PI | 3.8 ± 0.3 |
| PS | 29.4 ± 3.7 |
| SM | 18.0 ± 1.6 |
| TAG | 0.074 ± 0.13 |
| Total | 100 |

The levels of Triacylglycerides (TAG) and Diacylglycerides (DAG) are low, which indicate that the SEVs compositions isolated with the new inventive process are essentially not contaminated with lipoproteins.

Considering that these compositions contain high amounts of PC and SM (~50%), which both include choline groups, quantification of cholines was also included in the characterization of SEVs. For this purpose, a commercial kit with high sensibility for cholines can be used. In the present case the Phospholipid Assay Kit® MAK122-1KT from Sigma-Aldrich was used.

It was observed that the average concentration of cholines in the SEVs compositions is 25 uM, which corresponds approximately to 15 uM of PC and 10 uM of SM, considering their corresponding percentage as evaluated by Mass Spectrometry (Table 6). These results show that SEVs isolated with the inventive method have a lipid composition in accordance to what is described in the literature for SEVs isolated by prior art method.

In consequence, it is acknowledged that this quantification methodology may function as a measure of the quality of the compositions in function of their lipid content.

Therefore, in another embodiment the present invention refers to the use of a high sensibility for cholines, such as the above-mentioned Phospholipid Assay Kit® MAK122-1KT or similar for measurement of the quality of the compositions in function of their lipid content.

Another embodiment of the present invention relates to compositions comprising the SEVs isolated by the process of the present invention, in particular SEVs compositions comprising these three groups of molecules with biological activity.

In a preferred embodiment, the SEVs compositions comprise the 170 proteins listed in Table 1, in particular ANXA2, ANK1, CD63, CD81, CD9 and CD15.

In another preferred embodiment, the proteins in the SEVs compositions consist essentially in one or more selected from the group the 170 proteins listed in Table 1, in particular in at least one of the proteins selected from the group ANXA2, ANK1, CD63, CD81, CD9 and CD15.

In a more preferred embodiment proteins at least one of the following proteins are present in SEVs compositions in an amount of: CD81≥1%, CD9≥1%, CD63≥40%, CD15≥20% positive events as measured by flow cytometry of SEVs coupled to microbeads, or quantity of CD63≥5 pg/mL or ANXA2≥0.3 ng/mL in the purified SEVs, as measured by ELISA.

In another embodiment the SEVs compositions comprise micro RNA present in Table 4, preferably miR-150-5p, miR-223-3p, miR-16-5p, miR-142-3p, miR-19b.

In another preferred embodiment, the micro RNA present in the SEVs compositions consist in at least of one micro RNA as presented in Table 4, more preferably, consist in one or more micro RNA selected from the group of miR-150-5p, miR-223-3p, miR-16-5p, miR-142-3p, miR-19b.

In another preferred embodiment, the SEVs compositions comprise at least one of the following micro RNAs in the respective amounts: miR-150-5p>1.3 pg/10^9 part, miR-223-3p>1.2 pg/10^9 part, miR-16-5p>0.5 pg/10^9 part, miR-142-3p>0.4 pg/10^9 part, miR-19b>0.2 pg/10^9 part, as measured by direct quantification.

In another preferred embodiment, the micro RNA present in the SEVs compositions consist in at least of one micro RNA selected from the group of the following and respective amounts: miR-150-5p>1.3 pg/10^9 part, miR-223-3p>1.2 pg/10^9 part, miR-16-5p>0.5 pg/10^9 part, miR-142-3p>0.4 pg/10^9 part, miR-19b>0.2 pg/10^9 part, as measured by direct quantification.

In another embodiment, the lipids in the SEVs compositions consist essentially in one or more selected from the group the lipids listed in Table 6, i.e. CE, DAG, PA, PC, PE, PG, PI, PS, SM, TAG.

In another embodiment, said lipids are present in the SEVs compositions in a percentage, respective to the total lipid concentration, as listed in Table 6, i.e. CE≥0.05_±0.05, DAG≥1.3±0.4, PA≥3.18±0.6, PC≥30.9±3.3, PE≥13.0±0.5, PG≥0.25±0.1, PI≥3.8±0.3, PS≥29.4±3.7, SM≥18.0±1.6, TAG≥0.074±0.13.

In a preferred embodiment, the SEVs compositions comprise or consist respective to the 3 groups of molecules mentioned above and with biological activity, in:
  Proteins identified and respective amounts of Table 1 and 3;
  RNAs identified and respective amounts of Table 4 and 5, and
  Lipids of Table 6.

In another preferred embodiment, the SEVs compositions comprise or consist respective to the 3 groups of molecules mentioned above and with biological activity, in a combination of at least one of the following:
  Proteins: ANXA2, ANK1, CD63, CD81, CD9 and CD15;
  RNAs: preferably miR-150-5p, miR-223-3p, miR-16-5p, miR-142-3p, miR-19b, and
  Lipids of Table 6, i.e. CE, DAG, PA, PC, PE, PG, PI, PS, SM, TAG.

5. Biological Effect of the Compositions 5.1 In Vitro Anti-Inflammatory Impact on Macrophages Monocytes and macrophages possess broad immunomodulatory, inflammatory, and tissue-repairing capabilities and actively participate in the development of many autoimmune and diseases. In fact, infiltration and exaggerated activation of these cells is generally observed in many autoimmune diseases as well as inflammatory diseases such as type 1 diabetes, rheumatoid arthritis and others.

SEVs biological effect on inflammation was evaluated in an in vitro model composed by macrophages differentiated from a monocytic cell line (THP-1) by the action of a chemical compound, phorbol 12-myristate-13-acetate (PMA).

Differentiated macrophages were incubated with $1 \times 10^{10}$ part/mL of SEVs and after 24 hours, their phenotype was evaluated as well as the mRNA levels of three major cytokines involved in pro-inflammatory process were evaluated (FIG. 6A). As a positive control, macrophages were incubated with LPS, which induces a strong inflammatory response.

In response to different stimuli, macrophages can acquire two different major phenotypes: M1 (pro-inflammatory) and M2 (anti-inflammatory). The classically activated or M1 macrophage phenotype produces inflammatory cytokines such as TNF-$\alpha$, which trigger acute inflammation, while the alternatively activated M2 phenotype is anti-inflammatory and has been found to play an important role in tissue and wound repair.

In the present invention, CD86 and CD163 staining was used to distinguish between M1 and M2 phenotype, respectively according to the described by Martinez and Gordon (2014). It was observed a decrease in M1/M2 ratio in macrophages (CD14$^+$) treated with the SEVs isolated by the process of the invention indicating a higher prevalence of the anti-inflammatory macrophages (FIG. 6B).

In comparison with the vehicle (PBS), SEVs decreased the mRNA expression of IFN-$\gamma$, IL1$\beta$, TNF-a and COX-2 (FIG. 6C) in macrophages, although the differences were not statistically significant.

We then decided to evaluate if SEVs could counteract the progression to a chronic inflammatory state. For that we used THP-1 derived macrophages stimulated with LPS, and co-incubated with SEVs (FIG. 7A).

In this model, SEVs were able to decrease M1/M2 ratio with a higher impact than in the previous one (FIG. 7B). Concomitantly, mRNA expression of the different proinflammatory cytokine significantly decreased with SEVS treatment (FIG. 7C).

Additionally, we observed a significant decrease of TNF-α secretion in THP-1 derived macrophages, indicating that this cell model become less inflammatory.

These results indicate that SEVs may induce resolution of the inflammatory phase. Resolution of inflammatory phase would benefit not only skin inflammatory diseases as well as other systemic disease whose pathogenicity is centred on chronic inflammation.

5.2 In Vitro Immunomodulatory Effect of SEVs on Peripheral Blood Mononuclear Cells (PBNNCs)

With the aim to assess the immunomodulatory potential of the compositions of the present invention, samples of healthy human peripheral blood mononuclear cells (PBMNCs) with SEVs compositions of the present invention were analysed and T cell proliferation and polarization was evaluated.

A composition comprising SEVs and obtained according to the method of the present invention, as described in section 1, was applied to 3 donor samples of PBMNCs at $1 \times 10^{10}$ part/mL concentration. $10^6$ PBMNCs per well were cultured in 24 well plate with depleted-RPMI 1640 complete medium and after 6 days of incubation, T cell proliferation and the prevalence of Treg (positive for CD25 and FoxP3) was evaluated within T cell subpopulations by flow cytometry. Cells were washed, fixed and permeabilized before antibody staining.

A decrease in overall T lymphocyte population (CD3+ cells)—58.7±3.8% versus 38.9±6.6%—as well as in CD4+ T lymphocyte subset—42.9±2.1% versus 28.9±6.5%—and CD8+ T cells—66.2±4.1% versus 41.54±14.0% was observed upon treatment with SEVs composition (FIG. 8A-C). Nevertheless, no impact on cell viability was shown (FIG. 8D).

In addition, SEVs compositions were able to significantly increase the percentage of Treg in cultured samples (9.68±1.89% in treated, against 5.24±2.53% in control— culture without SEVs compositions (FIG. 9). These results indicate that said compositions are able to potentiate T cell polarization toward Treg cells which will increase immune tolerance and rebalance of Treg/Teff ratio.

To reinforce the idea of a rebalance in Treg/Teff ratio, IL-7 receptor a (CD127) was used as a negative marker of Treg since its expression is inversely correlated with FoxP3 activity and it is reported in the majority of effector and memory T cells. In this experiment, SEVs were able to increase Treg population within CD4+ cells while decrease the percentage of effector T cells (FIGS. 10A and B). At the end, these differences promote a higher Treg/Teff ratio in PBMNCs mixture (FIG. 10C). Although increased population of Tregs impairs anti-tumour immunity, in an autoimmune disease context, their presence is central to the maintenance of self-tolerance and tissue homeostasis. Moreover, SEVs seem to have an inhibitory effect in cell differentiation toward an effector phenotype.

There is a direct correlation between IFN-γ secretion and the level of T cell activation. In order to determine the effect of SEVs on the secretory IFN-γ response of T cells, PBMNCs were cultured in the presence and absence of SEVs for 6 days and intracellular levels of IFN-γ were determined on CD4+ and CD8' T cell subsets. Results show that, at day 6, the percentage of intracellular IFN-γ was reduced when PBMNCs were cultured with SEVs, in comparison to positive control, in both T cell subsets. However, this reduction was only statistically significant on gated CD4+ T cells (FIG. 11A). These results demonstrated that SEVs isolated by the innovative methodology of the invention impaired lymphocytes IFN-γ secretion.

Additionally, T helper cell polarization was evaluated by quantifying the expression of lineage genes in the lymphocyte subset at 2 and 6 days after SEVs administration. From the PBMNCs mixture, lymphocytes were sorted based on their size and complexity and total RNA was extracted, converted to complementary DNA and final analysed by quantitative PCR (qPCR). For this purpose, master transcription factors were evaluated for each lineage: GATA3 for Th2; T-bet for Th1; Foxp3 for Treg; and RORYT for Th17, according to the method described in Zhu, Yamane, and Paul (2010).

PBMNCs were incubated with SEVs compositions at $1 \times 10^{10}$ part/mL, and at day 6 (day zero is the day of administration), the expression of several transcription factors was quantified (FIG. 12). The SEVs compositions do not seem to substantially impact Th1 and Th2 T cell subset 6 days after SEVs administration, as observed from the mRNA levels of T-bet and Gata3 (FIGS. 12A and B). However, a tendency to downregulate these transcription factors is observed after 48h.

It was observed that the SEVs induce a differentiation to the Treg phenotype, with increased expression of FoxP3 (FIG. 12D).

Surprisingly, it was observed a significant inhibition of RORYT, which suggest decreased expansion of Th17 cells upon treatment with SEVs compositions (FIG. 12C). Therefore, exposing T-lymphocytes to SEVs compositions of the present invention increase the population of Treg cells, while limiting the Th17 T-cell subsets. These results are corroborated by the POC done in a mice model of psoriasis.

Finally, the SEVs potential was evaluated on the secretion of cytokines. Without any stimulus, we were not able to detect the secretion of any small molecule. However, lipopolysaccharide (LPS) stimulation highly increased the secretion. This way when stimulated simultaneously with LPS and SEVs, PBMNCs mixture significantly decrease TNF-α secretion. TNF-α is a pro-inflammatory cytokine that is involved in the regulation of immunity and several inflammatory diseases in humans. As it plays a critical role in the pathogenesis of autoimmune inflammatory diseases, current biological therapies are designed to block its biological function. Added to SEVs potential of increase Treg in the system, the decrease TNF-α secretion is another indication of SEVs immunomodulatory effect as well as a future autoimmune therapy.

Additionally, CCL20 secretion was also tested. One of the main effects of CCL20 is to promote the recruitment of CCR6+ lymphocytes. CCR6 is expressed by a variety of cells of the innate and/or adaptive immune system, in particular T-helper 17 (Th17) cells, which exert multiple functions via release of cytokine IL-17A in many chronic inflammatory disorders. Again, the decrease of in vitro production of this chemokine contributes to the immunomodulatory capacities of SEVs.

Evidence was shown that the SEVs compositions of the invention present immunotolerant properties, namely through T cell differentiation towards a regulatory phenotype.

To further understand the mechanism of action of these compositions, two different microRNAs (miR) were directly transfected into a PBMNCs mixture. miR-146-5p is highly expressed in regulatory T cells. It is indispensable for their immunosuppressive function, since its deletion results in a breakdown of immunological tolerance manifested in an IFNy-dependent immune-mediated lesions in a variety of organs. miR-150-5p is reported as Treg differentiation driver in conjugation of other miRs although its role is demonstrated through induction and proliferation of $CD8^+$ effector cells.

Regarding miR-146a-5p, results showed a significant increase on T-bet and FoxP3 expression (FIG. 14). The superior expression of FoxP3 indicates that the predominant role of miR-146-5p may be to differentiate T cells into Treg. Preferential differentiation into Th1 cells by miR-146-5p has already been demonstrated in atherosclerosis, where increased concentration of this miR lead to an overexpression of T-bet pathway.

Surprisingly, miR-150-5p transfection resulted in an overexpression of RORYT and FoxP3, which shows that this miR induces the differentiation into a new regulatory T cell subtype that was recently described as T regulatory 17 $FoxP3^+RORYt^+$, which is able to suppress Th17 differentiation and control autoimmunity.

In parallel with gene expression analysis, the percentage of Treg cells was quantified by flow cytometry, and it was observed an increase in regulatory T cell subset in PBMNCs transfected with both miR (FIG. 14E). Face to control (transfection agent: VirB), miR-146-5p was also able to reduce IL17A expressing cells (FIG. 14F).

In Short, it was Demonstrated that SEVs Compositions:
reduce/attenuate T cell proliferation;
induce the differentiation of regulatory T cells;
differentially influence mRNA expression in lymphocytes;
differentially influence FoxP3 mRNA expression in PBMNCs;
decrease the secretion of pro-inflammatory cytokines;
miR-150-5p and miR-146-5p show substantial impact on lymphocytes expression profile;
miR-150-5p and miR-146-5p show substantial impact on lymphocytes phenotype These results show that SEVs compositions of the present invention have an advantage effect on immune cells and therefore, said compositions are useful to be applied to treat or prevent diseases related with imbalance or overreaction of the immune system.

5.3 Effect in Psoriasis—In Vitro

Based on above described previous results that demonstrated that SEVs compositions are able to not only increase the number of Treg but also decrease the expression of RORYT, a master transcriptional factor of Th17 T cell lineage, the impact of compositions in models of psoriatic epidermis were studied.

For that purpose, first keratinocytes were differentiated with $Ca^{2+}$ to mimic the epidermis outermost layer and applied 5% of Imiquimod (IMQ), a compound described to resemble most of the psoriasis phenotype, through its proinflammatory properties.

After 3h of simultaneous incubation (SEVs compositions and IMQ), a decreased expression of TNF-α and an increased expression of VEGF-a and TGF-b1 was observed in response to the application of SEVs compositions (FIG. 15).

TNF-α is a pro-inflammatory cytokine that amplifies inflammation through several distinct pathways: facilitating entry of inflammatory cells into lesioned skin through induction of adhesion molecules on vascular endothelial cells; stimulating keratinocyte production of other pro-inflammatory mediators and activating dermal macrophages and dendritic cells. Thus, its inhibition promoted by the SEVs compositions can ameliorate psoriasis pathophysiology by blocking the vicious activating cycle of dendritic cells.

On the other hand, these compositions stimulated VEGFA and TGFb1 expression. VEGFA plays a key role in the establishment of an immunosuppressive tumour microenvironment, as it inhibits the maturation of dendritic cells, and stimulates the proliferation of Tregs.

Also, TGF-b1 has been shown to limit inflammation and to control peripheral tolerance by both direct and indirect regulation of autoreactive T cells. Although TGF-β is essential for T cell tolerance, it has recently been proposed that loss of TGF-β signalling alone is insufficient to induce autoimmunity.

In a similar model, SEVs compositions stimuli potentiated the downregulation of IL-6 expression when compared to the vehicle (FIG. 15D). This result is particularly important for the autoimmune diseases setting, as IL-6 is a cytokine capable of controlling Treg and Th17 balance. In CD4+ T cell differentiation, Treg and Th17 both depend on TGFb however Th17 requires additionally IL-6. Decreasing IL-6 expression may contribute to control autoimmune diseases, namely psoriasis.

Results Show that SEVs Compositions:
decreases expression of pro-inflammatory molecules such as TNF-a and IL-6 in psoriatic like-NHEK model;
potentiate VEGFA and TGFb1 expression in psoriatic like-NHEK model.

Therefore, it was also demonstrated that SEVs compositions of the present invention are useful to be applied to psoriasis treatment or prevention.

5.4 Effect in Psoriasis-Like Epidermis

To confirm the potential anti-psoriasis effect in skin, a commercial three-dimensional epidermis model (PSORIASIS LIKE EPIDERMIS, Sterlab) was used. The model was treated for 5 days with a single dose of SEVs a composition every day. At the end of experiment, cells were collected for RNA analysis and supernatant for protein secretion quantification.

Results show that the SEVs composition downregulates the mRNA expression of several cytokines such as IL-6, IL-8, TNF-a and IFN-g (FIG. 16A), which corroborated the data obtained with the in vitro IMQ-treated keratinocytes model.

Additionally, the expression of antimicrobial peptides (S100A7 and DEFB4) was analysed and found consistent downregulation of both (FIGS. 16B.1 and 16B.2). These peptides are largely expressed in psoriatic epidermis and are responsible for dysregulation of keratinocyte differentiation, a hallmark in psoriasis.

Furthermore, these antimicrobial peptides contribute to chemotaxis of neutrophils and T cells, exacerbating psoriasis phenotype. Decreasing the expression of these peptides significantly contributes to ameliorate the psoriatic pathophysiology.

Moreover, SEVs compositions do not seem to impact the differentiation stage of keratinocytes as no differences were seen on KRT5 (FIG. 16C.1). Interestingly, Cox-2 expression is downregulated in the treated group, which is expected to contribute for the control of inflammation (FIG. 16C.2). In turn, this enzyme is downregulated by miR-16-5p, which is one of the most abundant microRNA species in SEVs compositions, suggesting that the mechanism of action may be miR-16–dependent.

When analysing protein secretion, it was observed that the application of SEVs compositions decreases CCL20 and TNF-a (FIG. 16D), two cytokines involved in psoriasis pathology.

Results show that SEVs described in the present invention promote a robust anti-psoriasis effect, by influencing several molecular pathways, which sustain psoriasis and other autoimmune diseases. The results suggest that SEVs may be used as an anti-inflammatory for human diseases with epidermis involvement.

5.5 Effect in Psoriasis—In Vivo

To access the efficacy of the SEVs compositions on a psoriatic in vivo model, IMQ-induced skin inflammation was chosen as a model that phenotypically resembles psoriasis in mice, according to the method described in van der Fits et al. (2009).

The model was induced by topical application of Aldara@, a cream preparation containing 5% IMQ, every day for 5 days. IMQ is a ligand for the toll-like receptors TLR7 and TLR8 that exacerbates psoriasis at both the local treated areas as well as distant sites. TLR7 and TLR8 are expressed by monocytes, macrophages and dendritic cells that when are activated lead to pro-inflammatory cytokines and chemokines production. Application of Aldara® on hair-free back of mice results in the development of psoriasis-like lesions within 5 days of application and is underpinned by an influx of various cells as well as hyperplasia of the epidermis.

During the six days of consecutive topical treatment with SEVs compositions, the mice skin clinical score was monitored. The final value resulted in a sum of three parameters: severity of erythema (redness from 0 to 4), affected area (0-3) and desquamation (scale from 0-2). Topic application of SEVs compositions of the inventions delayed the appearing of psoriatic characteristics and attenuated them over time (FIG. 17C). The phenotypic exterior characteristics are corroborated by a decrease in epidermis thickness which is observed in mice treated with SEVS (FIG. 17D).

Additionally, topical treatment with said compositions significantly decrease the number of skin infiltrating neutrophils ($CD45^+CD11b^+Ly6G^+CD64^-$) and mature T lymphocytes ($CD45^+CD3^+TCR\alpha\beta^+$) (FIGS. 18A.2 and 18A.3). Both neutrophils and T cells are key players in the psoriasis pathogenesis.

Activated T cells produce abundant cytokines like IL-17, IFN-y, TNF, and IL-22 while neutrophils secrete chemokines, such as CXCL1, CXCL2, and CXCL8/IL-8. Both cytokines and chemokines contribute to psoriatic vicious cycle by polarizing de novo Th1 and Th17 immune cells and activating keratinocyte hyperproliferation. There is tendency for a decrease on the presence of inflammatory macrophages (FIG. 18A.1) which is reinforced by the decrease expression of iNOS in skin biopsies (FIG. 18B.3). Again, the decrease of infiltrated inflammatory cells at the skin would improve psoriatic symptoms.

Moreover, it is generally accepted that the pathogenesis of psoriasis involves accumulation of effector T-cells within lymph nodes and their subsequent migration into the skin through the blood system. Results show that Th17 cells and Gamma-delta expressing cells were significantly decrease in the mice lymph nodes treated with SEVs compositions (FIGS. 19A.3 and 19A.4). These cell subsets are the major IL17A producing cells and their reduction contributes to a significant improvement in psoriasis pathophysiology.

Besides the decrease of Th17 cells, mRNA RORgt levels were also decrease in lymph node samples of treated animals with SEVs (FIG. 19B.3). The decrease in IL-17 producing cells in lymph nodes can decrease further infiltration in mice skin and attenuate psoriasis. This effect may be also potentiated by the decrease of neutrophil number that diminishes the quantity of cytokines/chemokines in the microenvironment and hamper the recruitment of more T helper cells.

Additionally, and because psoriasis is a CD8 driven disease, the decrease of abundance of these cells both at skin (FIG. 18A.4) and lymph nodes (FIG. 19A.1) in animals treated with SEVs compositions described in this document would have a positive impact on the resolution of exacerbated immune responses.

Therefore, the SEVs compositions of the present invention are able to ameliorate psoriasis-like skin inflammation in an in-vivo model.

6. Effect in Tissue Repair—Wound Healing In Vivo

We decided to validate if the inventive process of isolation of SEVs would have an impact in their bioactivity and potential to treat skin wounds.

The results show that the SEVs isolated with the prior art method (UC—ultracentrifugation) are less bioactive than the ones isolated with inventive method UF-SEC (FIG. 20B). The inventive method significantly accelerated wound closure in all the animals used in the experiment. Moreover, in FIG. 20B we observe that the differences are concentrated in the first 7 days of healing; at day 3, animals treated with SEVs isolated with the inventive method showed a decreased in 20% of wound size and at day 10 this difference was still significant (FIG. 20B).

In conclusion, the present invention relates to a process for isolating Small Extracellular Vesicles secreted by umbilical cord blood cells (UCBCs), including isolating Small Extracellular Vesicles from umbilical cord blood mononuclear cells (UCBMNCs), and compositions comprising Small Extracellular Vesicles obtained by processing said UCB fraction, which is useful to be applied to inflammatory or autoimmune diseases therapeutics or prophylactics and/or cosmetic purposes.

Accordingly, the present invention also relates to Small Extracellular Vesicles pharmaceutical compositions useful to be applied in therapy, in cosmetics and/or in prophylactic methods.

Therefore, in one embodiment of the invention the SEVs as described above are used to produce a pharmaceutical composition to be applied as cosmetics, as a medicament and/or as prophylactic agent.

In another embodiment, the SEVs as described above are used to produce a pharmaceutical composition to be applied in autoimmune-disease therapy including in skin autoimmune-disease therapy.

In another embodiment, the SEVs as described above are used to produce a pharmaceutical composition to be applied as medicament in tissue repair including skin tissue repair, skin open wound therapy, such as an incision, a laceration, a tear, an abrasion, an avulsion or a surgical wound, skin burn therapy, such as a thermal burn, a chemical burn or a radiation burn, and/or a skin condition or disease, such as acne, psoriasis, rosacea, dermatitis, eczema, impetigo, intertrigo, or folliculitis, in wound therapy such as arterial ulcers, venous ulcers, diabetic ulcers and pressure ulcers, post-surgical ulcer, traumatic ulcer, mouth ulcer, diabetic foot ulcer or corneal ulcer, etc.

In another embodiment, the SEVs as described above are used to produce a composition in a liquid form, in a spray form, in a cream form, in a gel form, being the liquid form as an edible solution, external applicable solution, internal applicable solution or injectable solution.

In another embodiment, the SEVs as described above are used to produce a composition supported by a carrier such as a natural or synthetic polymer matrix, a patch or another suitable medical carrier.

EXAMPLES

Example 1. PBNKCs Collection and Processing

Human blood samples were obtained from the Hospital Universitário de Coimbra, where donations were collected from healthy volunteers after providing their informed consent. PBMNCs were isolated by Lymphoprep™ gradient centrifugation. PBMNCs were frozen and stored in liquid nitrogen. For in vitro experiments, cell aliquots were thawed at 37° C., added to 10 mL of RPMI 1640 and centrifuged at 300 g for 5 min to eliminate DMSO. Pellet was resuspended in RPMI 1640 supplemented with 10% of FBS. PBMCs were plated on 96-well flat bottom culture plates (Corning-Costar, Celbio, Milan, Italy) at the density of $2-3 \times 10^5$ cells/well and cultured with RPMI 1640 medium containing 10% FBS.

Example 2. Gene Expression Analysis

RNA samples were extracted by RNAeasy Mini kit (Qiagen) according to manufacture recommendation. RNA concentration was quantified with total RNA chips in Bioanalyzer 2100 (Agilent). All RNA samples were stored at −80° C. RNA was reverse-transcribed according to manufacturer's instructions of SuperScript IV VILO Master Mix (Invitrogen). After reverse transcription, the cDNA was immediately used for qPCR or were preserved at −20° C. qPCR was performed using the NZYSpeedy qPCR Green Master Mix (2x), ROX in a 96-well format in CFX96 Touch™ Real-Time PCR Detection System (BioRad).

The following conditions, 95° C. for 2 min, followed by 40 cycles at 95° C. for 5 s, 60° C. for 30 s, 72° C. for 20 s (measuring the fluorescence) were used for the qPCR. At least three biological replicates were used. β-actin (ACTB) was used as an endogenous control to normalize each sample. The resulting data was analysed using Bio-Rad CFX Manager software. The relative expression of interest genes was analysed according to the $2^{-\Delta\Delta Ct}$ method.

Example 3. Flow Cytometry

PBMNCs were collected and erythrocytes were osmotically lysed in red blood cell lysis buffer. For cell surface staining, single-cell suspensions were incubated for 30 min with saturating concentrations of mAbs. Cells were stained for the above identified cell surface markers, fixed 30 min at 4° C., permeabilized with the Foxp3/Transcription Factor Staining Buffer set (eBioscience) in the presence of anti-CD16/CD32 (eBioscience) for 15 min at 4° C., and lastly incubated for 1 hour at 4° C. with the above identified antibodies in permeabilization buffer. Samples were acquired using BD accuri C6 (BD Biosciences). Data were analysed using FlowJo 7.0.0. software.

Example 4. UCBMNCs Culture

PBMNCs were collected and erythrocytes were osmotically lysed in red blood cell lysis buffer. For cell surface staining, single-cell suspensions were incubated for 30 min with saturating concentrations of mAbs (Table 2). Cells were stained for the above identified cell surface markers, fixed 30 min at 4° C., permeabilized with the Foxp3/Transcription Factor Staining Buffer set (eBioscience) for 15 min at 4° C., and lastly incubated for 1 hour at 4° C. with the above identified antibodies in permeabilization buffer. Samples were acquired using BD accuri C6 (BD Biosciences). Data were analyzed using FlowJo 7.0.0. software.

Example 5. PBNNCs Transfection

In order to transfect PBMNCs with miRNAs Viromer® transfection reagents (Lipocalyx, Germany) were used. Viromer® Blue and Viromer® Green are polymer-based transfection reagents featuring a viral mechanism of membrane fusion. They do form transfection complexes with small interfering RNA (siRNA) or microRNA (miRNA) having a size of a few hundred nanometers. Viromer®:RNA complexes are taken up by endocytosis, a process that involves the formation of an acidic compartment. The low pH in late endosomes acts as a chemical switch that renders the Viromer® surface hydrophobic and facilitates membrane crossing. This "Active Endosome Escape" technology is safe and maximizes transfection efficiency as it is using a natural uptake pathway. Once reached the cytoplasm, Viromer complexes disaggregate—releasing RNA or DNA. The innovative Viromer® complexes are non-charged, preventing the aggregation with proteins which are included in foetal calf serum or other cell culture media supplements. This leads to the great advantage, that Viromer® is very gentle on cells, compatible with serum, antibiotics and differentiation factors.

Viromer® Blue and Viromer® Green are optimized for the in vitro transfection of siRNA and miRNA. They are highly effective on a wide range of standard and hard-to-transfect cells including suspension cells, stem cells and primary cells.

The transfections were performed accordingly to manufacturer's recommendations. Briefly, we pre-plated PBMNCs in 12-well plates at a concentration of $1 \times 10^6$ cells/ml (RPMI medium, no serum, no antibiotics). We then prepared a dilution of 10 μM miR-mimic in Viromer buffer and mixed it with Viromer transfection reagent. After 15 min at room temperature, the transfection complex was added to cells that were further incubated up to 6 days (miR-mimic final concentration was 100 nM).

Example 6. Statistical Analysis

Bar graphs are showed as mean±standard error of mean (SEM). The statistical significance was assessed by two-tailed unpaired Student's t test, one-way ANOVA with Tukey's multiple comparison or two-way ANOVA with Bonferroni multiple comparison post-test, as required. All analysis was performed with GrapPhad software. Differences were considered significant at $p<0.05$.

Example 7. Isolation of Small Extracellular Vesicles (SEVs)

UCB units were automatically processed by using an automated system AXP, according manufactures' recommendations. Briefly, cord blood is transferred into the processing bagset which is placed in the AXP device and then centrifuged. The AXP device fits into most standard blood bank centrifuge buckets allowing up to six samples to be processed simultaneously. During centrifugation, component stratification and separation occurs. RBCs are transferred to a separate sterile bag, the buffy coat which contains the MNC rich layer is delivered to a separate sterile freezing bag while the plasma remains in the processing bag (http://cescatherapeutics.com/blood-marrow-processing/axp-autoxpress/).

The MNCs obtained from the Umbilical Cord Blood (2.000.000 cells/mL) were cultured in X-VIVO 15 serum-free cell-culture medium (Lonza Group Ltd, Basel, Switzerland) supplemented with 0.5 ug/mL of FMS-like tyrosine kinase-3 and 0.5 ug/mL of stem-cell factor, under ischemia (0.5% O2) conditions.

After 18 hours of secretion the conditioned media was carefully removed to a falcon to proceed with the SEVs purification.

The conditioned media was cleared by 2 sequential centrifugation steps of 300 g (10 minutes) and 2000 g (20 minutes). After these steps the supernatant was collected and subject to two filtration steps using a syringe, first using a 0.45 uM filter and afterwards a 0.22 um. After this initial clearance the media was subject to a final ultrafiltration step using a pressure-controlled device (VivaCell 250).

The supernatant was subject to a pressure of 3 bar through a 100 KDa filter in a Vivacell (Sartorius) device and the supernatant containing the SEVs was recovered in the top compartment after a washing step with filtered PBS. Then, 13-15 mL of the concentrated solution were subject to a size exclusion chromatography using a Superose 6 pre-packed XK 26/70 (GE Healthcare), wherein the Superose 6 is a resin comprising a cross-linked porous agarose-based material with a biomolecular separation resolution between 5000 Da and 5000000 Da, respectively in a FPLC-Akta Avant Chromatographic system. A Filtered PBS solution was used as elution buffer at a flow rate of 3 mL/min (XK 26/70) and UV absorbance was detected at three wavelengths: 220, 260 and 280 nm. Fractions of 5 mL (XK 26/70) were collected, using an automatic fraction collector coupled with the equipment, for analysis by NTA and Micro BCA.

Example 8. Small Extracellular Vesicles (SEVs) Characterization 8.1. Protein Characterization SEVs isolated by the process of the present invention, referred herein as UF or INV process, were analysed by mass spectrometry to characterize their protein content. Protein concentrations were determined by micro BCA protein assay kit (Thermo Scientifics TM) and approximately 0.5 μg total peptide material was analysed using nanoscale liquid chromatography coupled to tandem mass spectrometry (nanoLC-MS/MS). Briefly, samples were lysed and loaded onto an SDS-PAGE gel. The resulting gel lane was washed, and proteins were reduced in DTT before alkylation. After washing, in-gel digestion using trypsin was done and peptides were separated by liquid chromatography and identified by MS. These proteins are listed in Table 1 and Table 2 in the Description Section.

From the three analysed pools of SEVs isolated by UF-SEC (each pool obtained from 5 UCB, totalizing 15 UCB), 31 proteins were identified as common between pools, representing in average 61% of the total identified protein content. Within this group, albumin and different haemoglobin subunits have the highest number of identified peptides, followed by band 3 anion transport protein and haptoglobin.

These proteins are essential constituents of human umbilical cord blood and their function is associated with oxygen delivery by red blood cells. Although MS is a very powerful tool and detects a high number of proteins in one single run, its sensitivity is defined by the dynamic range of the samples and proteins with a low expression may not be detected. We believe that is the reason why only 22.5% of detected proteins (7 out 31) are characteristic of SEVs, according to Vesiclepedia (http://www.microvesicles.org/).

8.2 RNA Characterization

RNA sequencing technique was used to identify the small RNA content of SEVs compositions. The RNA was isolated using EXIQON miRCURY™ Isolation kit (Cell & Plants) and small RNA quality and quantification was performed in Bioanalyzer 2100. 1.5 ng of small RNA was used for small library construction according to Ion Total RNA-Seq Kit v2 protocol. The pooled libraries further processed on Ion Chef™ System and the resulting 530™ chip was sequenced on Ion S5™ System. Cufflinks tool was used for annotation and estimation of the relative abundance of each gene in each sample.

SEVs isolated with the process of the present invention (INV) have different species of small RNAs, with transference RNA being the most abundant RNA species, representing in average 57%. microRNAs (miR) are the second most predominant specie (~27%) followed by ribosomal RNA (~6%) and other minor categories. Among samples, there are no major differences in RNA species. Again, although more samples are needed to test, a range of miR can be defined as shown in Table 4 and Table 5.

8.3. Lipid Characterization

| Lipid | Percentage of Total Lipids (%) |
|---|---|
| CE | 0.05 ± 0.05 |
| DAG | 1.3 ± 0.4 |
| PA | 3.18 ± 0.6 |
| PC | 30.9 ± 3.3 |
| PE | 13.0 ± 0.5 |
| PG | 0.25 ± 0.1 |
| PI | 3.8 ± 0.3 |
| PS | 29.4 ± 3.7 |
| SM | 18.0 ± 1.6 |
| TAG | 0.074 ± 0.13 |
| Total | 100 |

Example 9. Comparative Tests

For comparison purposes between the performance of a standard process of SEVs isolation as disclosed in WO2017163132 (COMP comparative process) and the process of the present invention (INV inventive process), Small Extracellular Vesicles from several equal samples of UCB were isolated and analysed being the results presented in the tables below.

The process of the present invention was performed according to what is described in the examples 1 to 8.

Under Ischemia Conditions

Before ischemia, the characterization of the cells derived from automatic UCB processing contain higher amounts of RBCs than the samples processed manually. Nevertheless, the ratio lymphocyte/monocyte in each group was maintained, and is not statistically different between the two UCB processing methods. More importantly the automatic UCB processing samples have more viable cells as shown by its lower percentage of cell death (~2%) when compared to manual processing (~8%).

After the Ischemia protocol (18h, 37° C. under 0.5% O2 and 5% CO2) each population maintained their representativeness namely the lymphocyte/monocyte ratio was maintained. As expected, due to the extreme conditions the cell death increases in both groups.

Table 7 shows the comparison between proteins isolated by the COMP process and INV process, and Table 8 presents the comparison of isolated proteins by both processes grouped by their biological functions.

Further, the percentage of small RNA species in Small Extracellular Vesicles isolated by the COMP and INV processes was also evaluated and is shown in Table 9, whereas Table 10 lists microRNAs identified in Small Extracellular Vesicles isolated by the INV process and COMP process.

TABLE 7

Comparison between proteins isolated by the COMP process and INV process

COMPARATIVE

| UniProt ID | Name | UniProt ID | Name | UniProt ID | Name |
|---|---|---|---|---|---|
| Q96PDS | PGLYRP2 | P60953 | CDC42 | P04080 | CSTB |
| Q9UIA9 | XPO7 | Q15758 | SLC1A5 | P02656 | APOC3 |
| P05090 | APOD | P59998 | ARPC4 | P01008 | SERPINC1 |
| Q86UX7 | FERMT3 | Q9HDC9 | APMAP | O43760 | SYNGR2 |
| P01011 | SERPINA3 | P62834 | RAP1A | O15243 | LEPROT |
| P05156 | CFI | P08865 | RPSA | O15230 | LAMA5 |
| P01019 | AGT | Q99623 | PHB2 | Q8IUA7 | ABCA9 |
| P05107 | ITGB2 | O75340 | PDCD6 | P61803 | DAD1 |
| P02652 | APOA2 | Q680K9 | HBM | Q9NZT1 | CALML5 |
| P22792 | CPN2 | P13639 | EEF2 | P26641 | EEF1G |
| O00560 | SDCBP | P54802 | NAGLLI | P48735 | IDH2 |
| P26038 | MSN | P32942 | ICAM3 | P07437 | TUBB |
| Q99880 | HIST1H2BL | P16070 | CD44 | P04433 | KV311 |
| P08575 | PTPRC | Q8NG11 | TSPAN14 | P00739 | HPR |
| P04899 | GNA12 | P35613 | BSG | P08631 | HCK |
| Q8WUM4 | PDCD6IP | O75131 | CPNE3 | P24158 | PRTN3 |
| P51149 | RAB7A | Q6UXB8 | PI16 | Q96897 | MYADM |
| P0C0L4 | C4A. C4B | Q95365 | 1B38 | B0I1T2 | MYO1G |
| P11215 | ITGAM | P02743 | APC5 | Q9Y336 | SIGLEC9 |
| P01861 | IGHG4 | Q90GMS | FETUB | P51884 | LUM |
| P05543 | SERPINA7 | O15162 | PLSCR1 | Q66K66 | TMEM198 |
| P04843 | RPN1 | P20702 | ITGAX | CM3759 | SYNGR1 |
| P0DOY3 | IGLC3 | P0DMV9 | H5PA1A | P02794 | FTH1 |
| P01009 | SERPINA1 | P37837 | TALDO1 | P04004 | VTN |
| Q9BQE3 | TUBA1C | P49368 | CCT3 | Q9Y286 | SIGLEC7 |
| P62873 | GNB1 | P12955 | PEPD | Q14739 | LBR |
| P09525 | ANXA4 | P14625 | HSP90B1 | P61981 | YWHAG |
| P30740 | SERPINB1 | P30101 | PDIA3 | P06276 | BCHE |
| Q92930 | RAB88 | P07339 | CTSD | Q76L83 | ASXL2 |

| COMMON | | | | INVENTIVE | |
|---|---|---|---|---|---|
| UniProt ID | Name | UniProt ID | Name | UniProt ID | Name |
| P0DOX2 | IGA2 | P46976 | GYG1 | P16157 | ANK1 |
| P0DOX7 | IGK | P69905 | HBA1 | P0C0L5 | C4B |
| P01871 | IGHM | P68871 | HBB | P31944 | CASP14 |
| P01619 | KV320 | P02042 | HBD | Q16778 | HI5T2H2BE |
| Q5VTE0 | EP1A3 | P69891 | HBG1 | P01859 | IGHG2 |
| P01876 | IGHA1 | P69892 | HBG2 | Q05707 | COL14A1 |
| P04217 | A1BG | P02008 | HBZ | Q01518 | CAP1 |
| P01023 | A2M | P62805 | HIST4H4 | P02549 | 5PTA1 |
| P63261 | ACTG1 | P00738 | HP | P16403 | HIST1H1C |
| P12814 | ACTN1 | P02790 | HPX | P00736 | C1B |
| P43652 | AFM | Q86YZ3 | HRNR | P0DOY2 | IGLC2 |
| P02765 | AHSG | P11142 | HSPA8 | P12273 | PIP |
| P02768 | ALB | P08514 | ITGA2B | Q96P63 | SERPINB12 |
| P04075 | ALDOA | P05106 | ITGB3 | P07478 | PRSS2 |
| P02760 | AMBP | P01591 | ICHAIN | P02649 | APOE |
| P04083 | ANXA1 | P14923 | IUP | Q14254 | FLOT2 |
| P50995 | ANXA11 | P01042 | KNG1 | Q08188 | TGM3 |
| P07355 | ANXA2 | P11279 | LAMP1 | P67936 | TPM4 |
| P12429 | ANXA3 | P31025 | LCN1 | Q06830 | PRDX1 |
| P08758 | ANXA5 | P07195 | LDHB | O43866 | CDSL |
| P08133 | ANXA6 | Q08380 | LGALS3BP | P08238 | HSP90AB1 |
| P20073 | ANXA7 | P02750 | LRG1 | Q9NZD4 | AHSP |
| O75882 | ATRN | P02788 | LTF | P01768 | HV330 |
| P25311 | AZGP1 | P61626 | LYZ | Q71D13 | H15T2H3C |
| P30043 | BLVRB | Q08431 | MFGE8 | P40926 | MDH2 |
| P02745 | C1QA | P05164 | MPO | P19338 | NCL |

TABLE 7-continued

Comparison between proteins isolated by the COMP process and INV process

| P02746 | C1QB | P35579 | MYH9  | Q93077 | HIST1H2AC |
| 502747 | C1QC | P60660 | MYL6  | P01031 | C5        |
| P09871 | C1S  | Q6UX06 | OLFM4 | P20618 | PSMB1     |

Comparative: Proteins isolated by the COMP process
Common: Proteins isolated by both COMP and INV processes
Inventive: Proteins isolated by the INV process

TABLE 8

Comparison of isolated proteins by INV and COMP processes grouped by their biological functions

| Biological function | INV % proteins | INV p-value | COMP % proteins | COMP p-value |
|---|---|---|---|---|
| neutrophil degranulation | 20.37 | P = 0.004 | 25.17 | P < 0.001 |
| cell adhesion | 1.85 | P = 0.72 | 9.79 | P < 0.001 |
| extracellular matrix organization | 1.85 | P = 0.41 | 8.39 | p = 0.001 |
| leukocyte migration | 7.41 | p = 1 | 7.69 | p = 0.012 |
| cellular protein metabolic process | 3.7 | p = 1 | 7.69 | p = 0.009 |
| innate immune response | 9.26 | p = 1 | 6.99 | P = 1 |
| regulation of complement activation | 12.96 | P < 0.001 | 6.29 | p = 0.004 |
| platelet degranulation | 5.56 | p = 1 | 6.29 | p = 0.014 |
| Fc-gamma receptor signaling pathway involved in phagocytosis | 9.26 | P = 0.0796 | 5.59 | p = 0.217 |
| receptor-mediated endocytosis | 9.26 | p = 1 | 5.59 | p = 0.541 |
| inflammatory response | 7.41 | p = 1 | 4.9 | P = 1 |
| complement activation, classical pathway | 12.96 | P = 0.002 | 3.5 | P = 1 |
| complement activation | 11.11 | P = 0.005 | 3.5 | P = 1 |
| immune response | 7.41 | p = 1 | 3.5 | P = 1 |
| protein deubiquitination | 12.96 | P = 0.187 | 2.1 | P = 1 |
| Fc-epsilon receptor signaling pathway | 7.41 | p = 1 | 1.4 | P = 1 |
| keratinization | 5.56 | p = 1 | 0.7 | P = 1 |
| MAPK cascade | 3.7 | p = 1 | 0.7 | P = 1 |
| NK-kB siganaling | 10.71 | P < 0.001 | 0.68 | p = 0.37 |
| T cell receptor signalling pathway | 10.71 | P < 0.001 | 1.37 | p = 0.33 |

TABLE 9

Percentage of small RNA species in Small Extracellular Vesicles isolated by the COM process and by the INV process.

| RNA | INV Average | INV SD | COMP Average | COMP SD |
|---|---|---|---|---|
| snRNA | 1.99 | 1.08 | 0.58 | 0.10 |
| snoRNA | 1.47 | 0.98 | 0.41 | 0.09 |
| rRNA | 6.19 | 0.97 | 14.40 | 1.67 |
| microRNA | 26.47 | 5.40 | 8.40 | 1.02 |
| tRNA | 57.23 | 6.87 | 6.25 | 2.61 |
| other | 6.65 | 1.23 | 69.26 | 4.18 |

TABLE 10

List of the microRNA identified in Small Extracellulare Vesicles isolated by the INV process and the COMP process

| Common | | | INV exclusive | |
|---|---|---|---|---|
| hsa-let-7a-5p | hsa-miR-16-5p | hsa-miR-26b-5p | hsa-let-7b-5p | hsa-miR-22-3p |
| hsa-let-7f-5p | hsa-miR-17-5p | hsa-miR-29b-3p | hsa-let-7c-5p | hsa-miR-26a-5p |
| hsa-let-7g-5p | hsa-miR-181a-5p | hsa-miR-30d-5p | hsa-let-7i-5p | hsa-miR-27a-3p |
| hsa-miR-103a-3p | hsa-miR-191-5p | hsa-miR-451a | hsa-miR-130a-3p | hsa-miR-27b-3p |
| hsa-miR-106b-5p | hsa-miR-19a-3p | hsa-miR-142-3p | hsa-miR-144-3p | hsa-miR-30b-5p |
| hsa-miR-142-3p | hsa-miR-19b-3p | hsa-miR-146b-5p | hsa-miR-144-5p | hsa-miR-3184-3p |
| hsa-miR-146a-5p | hsa-miR-20a-5p | hsa-miR-29a-3p | hsa-miR-185-5p | hsa-miR-376c-3p |
| hsa-miR-150-5p | hsa-miR-21-5p | hsa-miR-101-3p | hsa-miR-18a-5p | hsa-miR-486-5p |
| hsa-miR-15a-5p | hsa-miR-223-3p | | hsa-miR-205-5p | hsa-miR-92a-3p |
| hsa-miR-15b-5p | hsa-miR-23a-3p | | hsa-miR-221-3p | hsa-miR-93-5p |

In terms of Small Extracellular Vesicles yield (FIG. 3), it was observed that INV methodology, generates a higher number of Small Extracellular Vesicles per ml of conditioned media (CM). Additionally, the method the INV developed, generates a considerably higher yield of Small Extracellular Vesicles considering the major secreting cells present in cell cultures.

In summary, with this new process it is possible to increase the quantity of Small Extracellular Vesicles isolated from the conditioned media and this is very important in the production of SEVs.

Further, with this GMP-compliant optimized methodology it also possible to produce SEVs with very similar biophysical properties when compared to the prior art process (COMP).

Example 10. SEVs Effect in Immune Cells 10.1 PBMNCs
Differentiation of Regulatory T Cells Healthy blood donors PBMNCs were incubated with SEVs compositions ($1\times10^{10}$ part/mL) or the vehicle for 6 days. Cells were washed and stained for FACS analysis. Results are presented as mean±SD (n=5).

Statistical analysis was performed using student's t-test. To assess the immunomodulatory potential of the SEVs compositions, tests were performed on healthy human peripheral blood mononuclear cells (PBMNCs) with or without the presence of SEVs compositions of the invention and T cell polarization was evaluated.

After one application of SEVs composition and after 6 days of incubation, the prevalence of Treg (positive for CD25 and FoxP3) within T cell subpopulations was evaluated. SEVs composition was able to significantly increase the percentage of Treg in culture (9.68±1.89% in treated, against 5.24±2.53% in control) (FIG. 9). These results indicate that SEVs composition is able to potentiate T cell polarization toward Treg cells which will increase immune tolerance and rebalance of Treg/Teff ratio.

Differentially Influence mRNA Expression of Lymphocytes

Additionally, T helper cell polarization was evaluated by quantifying the expression of lineage genes in the lymphocyte subset through time. Master transcription factors was chosen to evaluate each lineage: GATA3 for Th2; T-bet for Th1; Foxp3 for Treg; and RORγT for Th17.

To complement the analysis, the expression of IFN-γ for CD8 T cells was also evaluated.

After 24h of incubation with SEVs, there are no significant differences in the transcription factors analyzed. After 48h, the differences started to accentuate between treated and non-treated groups, and at day 6 the transcriptional profile indicates a differentiation to the Treg phenotype, with increased expression of FoxP3 and TGF-β1.

SEVs does not seem to impact Th1 and Th2 T cell subset, as observed from the mRNA levels of T-bet and Gata3. Interestingly, it was observed a significant inhibition of RORγT, which suggests that there is a decreased expansion of Th17 cells upon SEVs treatment (FIG. 12).

Previous reports showed that approximately 50% of activated T cells expressing this transcription factor produce IL-17A, a key cytokine in the psoriasis pathophysiology.

Based on these results, we hypothesize that exposing T-lymphocytes to SEVs will increase the population of Treg cells while limiting the Th17 T-cell subsets.

These results are corroborated by the POC done in a mice model of psoriasis.

Moreover, it is well recognized that IFN-Y plays a critical role in the control of CD8 T cell expansion and contraction during immune responses. This T cell subset is responsible for the release of IFNg and TNFa, cytotoxic granules and also for destroying infected cells. SEVs induces downregulation of IFNg expression which suggests a lower number CD8+ T cell and a consequent anti-inflammatory effect (FIG. 11).

Differentially Influence FoxP3 mRNA Expression in PBMNCs

Healthy blood donors PBMNCs were incubated with SEVs ($1\times10^{10}$ part/mL) or the vehicle for 6 days. Total RNA was extracted, and gene expression analysis was performed using S-actin as reference gene. The normalized expression levels were calculated based on $2^{-\Delta\Delta Ct}$. Statistical analysis was performed using one-way ANOVA (n=3).

A different strategy was used to analyze T cell polarization when treated with SEVs. Total RNA was extracted from the total PBMNCs mixture instead of lymphocyte subset. Some of the previous differences were diluted maybe be due to an increase of heterogeneity of mRNA. Nevertheless, the increase of FoxP3 transcriptional factor expression was again observed. The immune modulatory effect of SEVs indicates toward an enrichment of Treg in the microenvironment, potentiating the immune tolerance. The other analyzed factors were not significantly altered by SEVs, with exception of Gata3 expression. Although not exclusively, Gata3 activity regulates Th2 differentiation and cytokine secretion. This decrease can be particularly important in in the treatment of asthma and allergic diseases.

Impact of miR-150-5p and miR-146-5p on Lymphocytes Expression Profile after 48h

Healthy blood donors PBMNCs were transfected with both miR using Viromer Blue. 2 days after transfection, lymphocyte compartment was sorted based on morphological features (FSC and SSC) and total RNA was extracted. Gene expression analysis was performed using β-actin as reference gene. The normalized expression levels were calculated based on 2-ΔΔCt. Statistical analysis was performed using student's t-test (n=3).

Impact of miR-150-5p and miR-146-5p on Lymphocytes Phenotype 6 Days after Transfection.

Healthy blood donors PBMNCs were transfected with both miR using Viromer Blue. 6 days after transfection, the percentage of Treg (CD4$^+$CD25$^+$FoxP3$^+$) and Th17 (CD4$^+$IL17A$^+$IFN$^-$) was analyzed by flow cytometry. Statistical analysis was performed using One way ANOVA (n=3).

At this point, we had some evidences that SEVs has immunotolerant properties namely through T cell differentiation towards a regulatory phenotype. To further understand the mechanism of action of our biological product, two different microRNAs (miR) that are present in SEVs were directly transfected into PBMNCs mixture. miR-146-5p is highly expressed in regulatory T cells. It is indispensable for their immunosuppressive function such as its deletion resulted in a breakdown of immunological tolerance manifested in a IFNγ-dependent immune-mediated lesions in a variety of organs. miR-150-5p is reported as Treg differentiation driver in conjugation of other miRs although its role is demonstrated through induction and proliferation of CD8$^+$ effector cells.

Regarding miR-146a-5p, our results showed a significant increase FoxP3 expression (FIG. 14). The superior expression of FoxP3 indicates that the predominant role of miR-146-5p may be to differentiate T cells into Treg.

Interestingly, miR-150-5p transfection resulted in an overexpression of RORγT and FoxP3, which suggests that this miR may induce the differentiation into a new regulatory T cell subtype that was recently described as T regulatory 17 FoxP3+RORYt+, which is able to suppress Th17 differentiation and control autoimmunity.

In parallel with gene expression analysis, flow cytometry data also showed an increase in regulatory T cell subset in PBMNCs transfected with both miR (FIG. 14). Face to control (transfection agent: VirB), miR-150-5p was also able to reduce IL17A expressing cells (FIG. 14).

These results indicate that a possible enrichment with these miRs could potentiate immunomodulatory potential of SEVs, generating an improved version of the product.

Example 11. Effect in Psoriasis—In Vitro 11.1. Imiquimod-Induced Psoriatic Model
SEVs decreases TNF-a expression while potentiate VEGFA and TGFb1 Expression in Psoriatic Like-NHEK Model NHEK were terminally differentiated for 3 days with 2 mM of $CaCl_2$. Then, IMQ was added for 3h in order to potentiate their pro-inflammatory phenotype. Finally, treatment was administered in co-incubation with IMQ for 3h and cells were collected for RNA extraction. 500 ng of RNA was used for reverse transcription reaction. mRNA expression was normalized by b-actin expression gene (n=3 for each condition).

Based on previous results that demonstrated that SEVs is able to not only increase the number of Treg but also decrease the expression of RORYT, a master transcriptional factor of Th17 T cell lineage, we decided to study the impact of SEVs in models of psoriatic epidermis.

For that, first we differentiated keratinocytes with $Ca^{2+}$ to mimic the epidermis outermost layer and applied 5% of IMQ, a compound described to resemble most of the psoriasis phenotype, through its proinflammatory properties.

After 3h of simultaneous incubation (SEVs and IMQ), we observed decreased expression of TNF-α and an increased expression of VEGF-a and TGF-b1 in response to SEVs (FIG. 15).

TNF-α is a pro-inflammatory cytokine that amplifies inflammation through several distinct pathways: facilitating entry of inflammatory cells into lesioned skin through induction of adhesion molecules on vascular endothelial cells; stimulating keratinocyte production of other pro-inflammatory mediators and activating dermal macrophages and dendritic cells. Thus, its inhibition promoted by SEVs could ameliorate psoriasis pathophysiology by blocking the vicious activating cycle of dendritic cells.

On the other hand, SEVs stimulated VEGFA and TGFb1 expression. VEGFA plays a key role in the establishment of an immunosuppressive tumor microenvironment, as it inhibits the maturation of dendritic cells, and stimulates the proliferation of Tregs.

Also, TGF-b1 has been shown to limit inflammation and to control peripheral tolerance by both direct and indirect regulation of autoreactive T cells. Although TGF-β is essential for T cell tolerance, it has recently been proposed that loss of TGF-β signaling alone is insufficient to induce autoimmunity.
Proinflammatory Cytokine Expression in Psoriatic Like-NHEK after SEVs Treatment for 3 Days NHEK were terminally differentiated for 6h with 2 mM of CaCl2). Then, CaCl and IMQ were added for 18h in order to potentiate their pro-inflammatory phenotype and differentiation. Finally, treatment with SEVs ($1\times10^{10}$ part/mL) was administered in co-incubation with IMQ for 3 days. Cells were collected for RNA extraction and supernant was also collected for ELISA. 1 µg of RNA was used for reverse transcription reaction. mRNA expression was normalized by b-actin expression gene (n=3 for each condition).

In a similar model, SEVs stimulus potentiated the downregulation of IL6 expression when compared to the vehicle (FIG. 15). This result is particularly important in autoimmune diseases, as IL6 is a cytokine capable of controlling Treg and Th17 balance. In CD4+ T cell differentiation, Treg and Th17 both depend on TGFb however Th17 requires additionally IL6. Decreasing IL6 expression may contribute to control autoimmune diseases, namely psoriasis.

11.2. Psoriasis-Like Epidermis
Gene Expression Profile in a Three-Dimensional Epidermis-Like Psoriatic Model after SEVs Treatment for 5 Days RNA was extracted using RNAeasy Mini Kit (Qiagen) according to manufacture recommendations. 500 ng of RNA was used for reverse transcription reaction. mRNA expression was normalized by b-actin expression gene (n=3 for each condition).

To confirm the potential anti-psoriasis effect in skin, we have used a commercial three-dimensional epidermis model (PSORIASIS LIKE EPIDERMIS, Sterlab). The model was treated for 5 days with a single dose of SEVs every day. At the end of experiment, cells were collected for RNA analysis and supernatant for protein secretion quantification.

SEVs downregulates the mRNA expression of several cytokines such as IL-6, IL-8, TNF-a and IFN-g (FIG. 16), which corroborated the data obtained with the in vitro IMQ-treated keratinocytes model.

Additionally, we have analyzed the expression of antimicrobial peptides (S100A7 and DEFB4) and found consistent downregulation of both (FIG. 16). These peptides are largely expressed in psoriatic epidermis and are responsible for dysregulation of keratinocyte differentiation, a hallmark in psoriasis (Martinsson, Yhr, and Enerback 2005).

Furthermore, these antimicrobial peptides contribute to chemotaxis of neutrophils and T cells, exacerbating psoriasis phenotype. Decreasing the expression of these peptides may significantly contribute to ameliorate the psoriatic pathophysiology.

Moreover, SEVs does not seem to impact the differentiation stage of keratinocytes as no differences were seen on KRT5. Interestingly, Cox-2 expression is downregulated in SEVs treated group, which is expected to contribute for the control of inflammation. In turn, this enzyme is downregulated by miR-16-5p (Shanmugam, Reddy, and Natarajan 2008), which is one of the most abundant microRNA species in SEVs, suggesting that the mechanism of action may be miR-16-dependent.

Protein secretion in a three-dimensional epidermis-like psoriatic model after SEVs treatment for 5 days. After 5 days of culture, the supernatant was collected and analyzed by ELISA. (n=3 for each condition). When analyzing protein secretion we found that SEVs decreases CCL20 and TNF-a (FIG. 16), two cytokines involved in psoriasis pathology.

Example 12. Effect in Psoriasis—In Vivo

Topic-SEVs Amelirorates Psoriasis-Like Skin Inflammation in Mice.

Photographs of the shaved skin on mice's backs were taken 6 days after topical treatment. Clinical scoring was performed by ranking severity of erythema (redness from 0 to 4), affected area (0-3) and desquamation (scale from 0-2). Infiltration of IMQ-treated back skin by inflammatory cells was revealed by flow cytometry using, granulocyte (Ly6G) (B) and TCRab+(C) markers. Lymph node T cell phenotyping was performed by flow cytometry using CD4, CD8 and GL3 T cell markers as well as CD44 and CD62L (memory associated marker) and CCR6, Th17 marker. Data represent means±SEM for n=6 mice per group. P-values were calculated by Student's t-test.

To access the efficacy of SEVs on a psoriatic in vivo model, IMQ-induced skin inflammation was chosen as a model that phenotipically resembles psoriasis in mice. The model was induced by topical application of Aldara, a cream preparation containing 5% IMQ, every day. IMQ is a ligand for the toll-like receptors TLR7 and TLR8 that exacerbates psoriasis at both the local treated areas as well as distant sites. TLR7 and TLR8 are expressed by monocytes, macrophages and dendritic cells that when are activated lead to pro-inflammatory cytokines and chemokines production. Application of Aldara on hair-free back of mice results in the development of psoriasis-like lesions within 5 days of application and is underpinned by an influx of various cells as well as hyperplasia of the epidermis.

During the six days of consecutive treatment with SEVs topically, the mice skin clinical score was monitored. The final value resulted in a sum of three parameters: severity of erythema (redness from 0 to 4), affected area (0-3) and desquamation (scale from 0-2). Topic application of SEVs delayed the appearing of psoriatic characteristics and attenuated them over time (FIG. 17).

Additionally, topical treatment with SEVs significantly decrease the number of skin infiltrating neutrophils ($CD45^+$ $CD11b^+Ly6G^+CD64^-$) and mature T lymphocytes ($CD45^+$ $CD3^+TCR\alpha\beta^+$) (FIG. 18). Both neutrophils and T cells are key players in the psoriasis pathogenesis. Activated T cells produce abundant cytokines like IL-17, IFN-$\gamma$, TNF, and IL-22 while neutrophils secrete chemokines, such as CXCL1, CXCL2, and CXCL8/IL-8. Both cytokines and chemokines contribute to psoriatic vicious cycle by polarizing de novo Th1 and Th17 immune cells and activating keratinocyte hyperproliferation.

Moreover, it is generally accepted that the pathogenesis of psoriasis involves accumulation of effector T-cells within lymph nodes and their subsequent migration into the skin through the blood system. In our experiment, we observed that Th17 cells and Y$\delta$ expressing cells were significantly decrease in the mice lymph nodes treated with SEVs (FIG. 19). These cell subsets are the major IL17A producing cells and their reduction contributes to a significant improvement in psoriasis pathophysiology.

We believed that the decrease in IL-17 producing cells in lymph nodes would decrease further infiltration in mice skin and attenuate psoriasis. This effect will be also potentiated by the decrease of neutrophil number that will diminish the quantity of cytokines/chemokines in the microenvironment and hamper the recruitment of more T helper cells.

Example 13. Up-Scaling the Process of the Present Invention

The purification of SEVs was tested in conditions that mimic the ones used in a GMP unit with the use of Tangential Field flow (TFF) for micro and ultrafiltration (UF). The results were compared to our lab-scale UF/SEC method. The idea was to observe by biophysical characterization of the SEVs if the TFF could be used in the future as an SEVs isolation methodology.

Example 14: SEVs Promote In Vivo Wound Healing

We decided to validate if the inventive process of isolation of SEVs would have an impact in their bioactivity and potential to treat skin wounds.

Briefly two excisional wounds were performed in the dorsal region STZ-induced diabetic mouse model, and applied SEVs in solution ($2.5 \times 10^8$ particles) topically, twice a day. The wound area was measured during the experiment in order to assess the efficacy of SEVs in the wound healing kinetics. The results show that the SEVs isolated with the prior art method (UC—ultracentrifugation) are less bioactive than the ones isolated with inventive method UF-SEC (FIG. 20B). The inventive method significantly accelerated wound closure in all the animals used in the experiment. Moreover, in FIG. 20B we observe that the differences are concentrated in the first 7 days of healing; at day 3, animals treated with SEVs isolated with the inventive method showed a decreased in 20% of wound size and at day 10 this difference was still significant (FIG. 20B).

REFERENCES

"Autoimmune Disease Statistics—AARDA." n.d. Accessed Sep. 5, 2019. https://www.aarda.org/news-information/statistics/.

Fits, L. van der, S. Mourits, J. S. A. Voerman, M. Kant, L. Boon, J. D. Laman, F. Cornelissen, et al. 2009. "Imiquimod-Induced Psoriasis-Like Skin Inflammation in Mice Is Mediated via the IL-23/IL-17 Axis." *The Journal of Immunology* 182 (9): 5836-45. https://doi.org/10.4049/jimmunol.0802999.

Martinez, Fernando 0, and Siamon Gordon. 2014. "The M1 and M2 Paradigm of Macrophage Activation: Time for Reassessment." *F1000prime Reports* 6: 13. https://doi.org/10.12703/P6-13.

Martinsson, Hanna, Maria Yhr, and Charlotta Enerback. 2005. "Expression Patterns of S100A7 (Psoriasin) and S100A9 (Calgranulin-B) in Keratinocyte Differentiation." *Experimental Dermatology* 14 (3): 161-68. https://doi.org/10.1111/j.0906-6705.2005.00239.x.

Navegantes, Kely Campos, Rafaelli de Souza Gomes, Priscilla Aparecida TArtari Pereira, Paula Giselle Czaikoski, Carolina Heitmann Mares Azevedo, and Marta Chagas Monteiro. 2017. "Immune Modulation of Some Autoimmune Diseases: The Critical Role of Macrophages and Neutrophils in the Innate and Adaptive Immunity." *Journal of Translational Medicine* 15. https://doi.org/10.1186/S12967-017-1141-8.

Rosenblum, Michael D, Kelly A Remedios, and Abul K Abbas. 2015. "Mechanisms of Human Autoimmunity." *The Journal of Clinical Investigation* 125 (6): 2228-33. https://doi.org/10.1172/JCI78088.

Shanmugam, Narkunaraja, Marpadga A. Reddy, and Rama Natarajan. 2008. "Distinct Roles of Heterogeneous Nuclear Ribonuclear Protein K and MicroRNA-16 in Cyclooxygenase-2 RNA Stability Induced by S100b, a Ligand of the Receptor for Advanced Glycation End Products." *Journal of Biological Chemistry* 283 (52): 36221-33. https://doi.org/10.1074/jbc.M806322200.

Siegel, Jay P. 1988. "Effects of Interferon-$\gamma$ on the Activation of Human T Lymphocytes." *Cellular Immunology* 111 (2): 461-72. https://doi.org/10.1016/0008-8749(88)90109-8.

Zhu, Jinfang, Hidehiro Yamane, and William E Paul. 2010. "Differentiation of Effector CD4 T Cell Populations (*)." *Annual Review of Immunology* 28: 445-89. https://doi.org/10.1146/annurev-immunol-030409-101212.

The invention claimed is:

1. A method for isolating Small Extracellular Vesicles (SEVs) secreted by umbilical cord blood mononuclear cells (UCBMNCs) comprising:
   i) a first step of culturing the UCBMNCs under ischemia conditions;
   ii) a second step of obtaining culture media from the UCMBNCs;
   iii) a third step of sequentially centrifuging and concentrating the culture media, to clear the culture media from large particles and cell debris, the third step comprising:
      a) sequentially centrifuging the culture media, including a first centrifuging at 200 g-400 g for 10-20 min, and a second centrifuging at 1500 g-2500 g, for 20-30 min, at a temperature of 4-10° C., thereby generating a cleared supernatant;
      b) sequentially twice microfiltering and ultrafiltering the cleared supernatant, including:
      a first microfiltering with a first filter having a pore size of 800 nm-450 nm, thereby generating a first filtrate; and
      a second microfiltering with a second filter having a pore size of 250 nm-200 nm, thereby generating a second filtrate; and
      ultrafiltering the second filtrate, using a membrane with a molecule size cut-off of 100 KDa, at an adequate constant pressure, under stable stirring conditions of 100-200 rpm, to obtain a mixture of particles larger than 100 KDa and smaller than 200 nm; and
      c) concentrating the mixture to obtain a final volume of up to 10× less than initial volume of the mixture, thereby generating a concentrated mixture; and
   iv) a fourth step of further purifying the concentrated mixture by size exclusion chromatography (SEC), to remove small soluble proteins from the SEVs, the fourth step comprising:
      a) separating SEVs from soluble proteins m the filtrate by Size Exclusion Chromatography (SEC), using a resin comprising a cross-linked porous agarose-based material with a biomolecular separation resolution between 5000 Da and 5000000 Da, and using a 280 nm absorbance signal for detection of SEVs, and
      b) collecting an SEVs fraction from the SEC at a stable temperature of 4 to 10° C., starting at an increase leading to a first peak of the 280 nm absorbance signal, and ending when the 280 nm absorbance signal of the first peak goes down to zero, thereby producing SEVs with anti-inflammatory properties.

2. The process according to claim 1, further comprising a dilution step of the second filtrate of step iii (b) with water, or a buffer solution with neutral pH, of at least 1:1 or a washing step of the solution mixture of iii (b) with water, or a buffer solution with neutral pH and in a proportion of 1:4 respectively.

3. The process according to claim 1, wherein the UCBMNCs comprise lymphocytes, monocytes, neutrophils, eosinophils, or basophils.

4. The process according to claim 1, wherein the UCBMNCs consist essentially in lymphocytes, monocytes, neutrophils, eosinophils or basophils.

5. The process according to claim 1, further comprising a concentration step of SEVs fraction by using a filter with pore size of 10 KDa.

6. The process according to claim 1, further comprising a lyophilisation step.

* * * * *